United States Patent [19]

Küpfer

[11] Patent Number: 5,784,022
[45] Date of Patent: Jul. 21, 1998

[54] PROCESS AND AMPLITUDE OR PHASE MONOPULSE RADAR DEVICE FOR LOCATING FLYING OBJECTS

[75] Inventor: Hanspeter Küpfer, Birmensdorf, Switzerland

[73] Assignee: Siemens Switzerland AG, Zurich, Switzerland

[21] Appl. No.: 817,703

[22] PCT Filed: Apr. 9, 1996

[86] PCT No.: PCT/CH96/00124

§ 371 Date: May 2, 1997

§ 102(e) Date: May 2, 1997

[87] PCT Pub. No.: WO97/22890

PCT Pub. Date: Jun. 26, 1997

[30] Foreign Application Priority Data

Dec. 19, 1995 [CH] Switzerland ............ 03590/95

[51] Int. Cl.$^6$ .......................... G01S 13/44; G01S 13/72
[52] U.S. Cl. .................... 342/80; 342/96; 342/97; 342/149; 342/154; 342/153; 342/194; 342/195
[58] Field of Search .................. 342/80, 90, 95, 342/96, 97, 148, 149, 152, 153, 154, 155, 157, 158, 194, 195, 203

[56] References Cited

U.S. PATENT DOCUMENTS

| | | | |
|---|---|---|---|
| 4,084,160 | 4/1978 | Lenenberger et al. | 342/148 |
| 4,219,816 | 8/1980 | Schenkel et al. | 342/89 |

FOREIGN PATENT DOCUMENTS

| | | |
|---|---|---|
| 592887 | 5/1975 | Switzerland . |
| 629898 | 2/1978 | Switzerland . |
| 2014393 | 8/1979 | United Kingdom . |

OTHER PUBLICATIONS

M. Skolnic, *Radar-Handbook*, McGraw Hill, Chapter 21 (1970).

S. Sherman, "Monopulse Principles and Techniques," *Aspects of Modern Radar*, E. Brookner (ed.), Artech House, Inc., Chapter 5 (1988).

Acker, *How to Speak Radar, Basic Fundamentals and Applications of Radar*, Varian Assoc., pp. 30–31 (1988).

Leonov et al., *Monopulse Radar*, Artech House, Inc., chapter S.4.4 ("Functional Signal Processing").

Schenkel, *Cross-Feed Monopulse–A Specific Method to Eliminate Mistracking Over Sea*, Presented at International Conference "Radar-87", London (Oct. 19–21, 1987).

Sherman, *Monopulse Principles and Techniques*, Artech House, pp. 73–75 and 339–343 (1984).

*Antenna Engineering Handbook*, Third Edition, R. Johnson (ed.), McGraw-Hill, Inc., chapter 33, pp. 33-36–33-38 (1993).

Onsy A. Abd El-Alim et al., "Second-Order Discriminant Function for Amplitude Comparison Monopulse Antenna Systems," *IEEE Transactions on Instrumentation Measurement*, Bd. 40, No. 3, pp. 596–600 (Jun. 1991).

*Primary Examiner*—John B. Sotomayor
*Attorney, Agent, or Firm*—Greenblum & Bernstein P.L.C.

[57] ABSTRACT

The process and the corresponding phase or amplitude-single pulse radar device are used to locate a first and possibly a second target (TT1, TT2) detected by the radar beam from the direction x1, y1; x2, y2. The extended single-pulse aerial of the radar device has at least three partial aerials for a first measuring axis x (e.g. azimuth) which are arranged in such a way, have such directional characteristics and the signals of which are combined together and weighted in such a way that two mutually linearly independent, purely real or purely imaginary aerial functions which are independent of target displacements perpendicular to the first measuring axis are formed. The function course of these aerial functions $F1(x)$ and $F2(x)$ is measured for the individual case and the functional values dependent upon the target displacement x are stored in the storage unit (MEM). Measurements are found for the targets of the position x1 and x2 detected by the radar beam according to the aerial functions F1 and F2.

31 Claims, 9 Drawing Sheets

PROCESS AND AMPLITUDE OR PHASE MONOPULSE RADAR DEVICE FOR LOCATING FLYING OBJECTS

The current invention relates to a process according to the preamble to claim 1 or 8.

Today, monopulse radar devices are normally used for the locating and if need be, tracking flying objects; among other places, these radar devices are described in M. Skolnic, Radar-Handbook, McGraw Hill 1970, chapter 21, or E. Brookner (editor), ASPECTS OF MODERN RADAR, Artech House, Inc. 1988, chapter 5 (S. M. Sherman, Monopulse Principles and Techniques). With monopulse radar devices, with each pulse received, angular error signals in azimuth and elevation are generated, which approach zero when the antenna or bore sight axis is aimed precisely at the target. The aligning and if need be, guidance of the bore sight axis is executed mechanically or, in the case of a phased array antenna, electronically. With a phased array antenna, often the measurement range in elevation is electronically scanned and the measurement range in azimuth is mechanically scanned (A. E. Acker, HOW TO SPEAK RADAR, BASIC FUNDAMENTALS AND APPLICATIONS OF RADAR, Varian Associates, Palo Alto 1988, pp. 30 and 31).

Known amplitude or phase monopulse radar devices supply precise angular measurement data with regard to a flying object, provided that in addition to the signals received directly from the flying object monitored, no signals from other objects or signals reflected once or multiply by the first or the other objects are received.

FIG. 1 shows two flying objects TT1 and TT2 in an antenna beam B, of which the first is disposed above the bore sight axis bx and the second is disposed below it. According to E. Brookner, loc. cit., chapter 5, pp. 323–330, with a conventional monopulse radar device, the spatial position of a flying object can no longer be precisely determined as soon as a second flying object is disposed in the same radar beam. In comparison to the single-target case, the phase of the resultant difference signal changes in relation to the composite signal. Moreover, conventional monopulse radar devices supply incorrect angular measurement data if the targets cannot be separated by distance as well. A particular instance of the double-target case is the mirroring of the radar echo from a flying object, reflected on the surface of water, for example.

If for example, an object that is flying over water is tracked using a tracking radar device, usually an elevation angular error signal occurs, which is not zero, even if the bore sight axis is aimed precisely at the flying object. In addition to the echo signal of the flying object monitored, a second target echo signal is received, which is reflected off the surface of the water. Then the resultant signal cannot be resolved with regard to these two signals either in distance or in angle. The overlapping of these two echo signals thus produces incorrect data with regard to the elevation of the target object. As a result, during the guidance phase, the elevation servo circuit guides the bore sight axis in an incorrect direction offset from the target. It is further known that for the simultaneous measurement of $n_z$ different coherent targets in 2 dimensions, theoretically at least $m_a=2*n_z$ different subantennas are required (independent receiving points within an antenna system), which transmit complex signals that have to be processed in exactly calibrated, stable in-phase and quadrature channels. To ascertain target data, ma complex equations are required, which have to be solved for the unknown quantities by the computer of the radar system (see A. I. Leonov, K. I. Formichev, Monopulse Radar, 1986 Artech House, Inc., chapter 5.4.4 (Functional Signal Processing)). Due to the difficulties to be expected, up to this point, these theoretical considerations have not yet been converted into the proposed form in actual practice (see E. Brookner, loc. cit., chapter 5.7, pp. 323 and 324). They form the basis for the embodiment explained below, in which, by means of concerted simplifications, a process was successfully arrived at for measuring two simultaneously occurring targets, but could only be used for tracking radar devices because of the restrictions applied.

As a result of this process, which is known from Dr. A. Schenkel, Crossfeed Monopulse—a Specific Method to Eliminate Mistracking Over Sea, presented at the international conference "Radar-87", London, Oct. 19–21, 1987, incorrect measurements of objects flying over water are prevented. With this method, which is described further in the patent documents U.S. Pat. No. 4,084,160 and U.S. Pat. No. 4,219,816 or CH 592 887 and CH 629 898, the angular error signals used previously and other angular error signals are employed, which in the correct combination produce a signal zero value on the bore sight axis, even in the event of reflection. The use of this method in the measurement of a flying object in azimuth and elevation additionally permits a measurement not only in the event of the reflection case described (targets 1 and 2 have the same azimuth), but also in the general double-target case (targets 1 and 2 differ in azimuth and elevation). The radar device used for this method is an amplitude monopulse radar device in which the conventional antenna, which is provided with four antenna horns (feeds), (see E. Brookner, loc. cit., chapter 5, p. 301, FIGS. 5.1–3) is rotated by 45° (diamond-shaped disposition of the antenna horns). Together with the previously known antenna signals (see E. Brookner, loc. cit., chapter 5, p. 301, FIGS. 5.1–3: sum, traverse difference, elevation difference) a so-called cross signal (cross difference or cross term signal) is used in it in a novel manner, which signal corresponds to the difference of the two composite signals, which are constituted by the addition of the signals of the antenna horns disposed diagonally across from each other. Furthermore, an antenna that has three antenna horns forming a triangle can be used for this method. The crossfeed method is thus based, among other things, on the evaluation of a cross term signal that is generated by the subtraction of signals transmitted by the antenna horns, which are not all disposed in the measurement plane and form a cross in the basic embodiment of the crossfeed antenna.

Although the (crossfeed) process described achieved fundamental improvements in comparison to the conventional monopulse process, under certain circumstances, measurement errors must be reckoned with, even with this process. In the event, for example, that a flying object appears at an angle of 45° over the antenna that is rotated by 45° (diamond-shaped disposition of the antenna horns according to CH pat. 592 887, FIG. 2a), and consequently has the same offset position in elevation and azimuth, the antenna functions like a conventional monopulse antenna with regard to this object, because the cross term signal becomes equal to zero, as can be easily verified. In an antenna apparatus with three antenna horns (A, B, C) according to CH pat. 592 887, FIG. 2c, measurement errors also occur, which are greatly dependent upon the movement of the flying object to be measured perpendicular to the measurement axis and therefore perpendicular to the segment that is formed by both of the horns (A and C) that supply the composite component of the cross term signal. Less distinct, but nevertheless detectable, these problems occur in the diamond-shaped disposition of the antenna horns; for one measurement axis, four antenna horns must be provided instead of three. In these apparatuses, though, measurement errors can only be prevented if the bore sight axis is precisely aimed at the target and the antenna horns have identical characteristic curves and are precisely adjusted. However, this can only be achieved by tracking radar devices with a servo circuit and with a correspondingly high expenditure. According to E. Brookner, loc. cit., chapter 5.1.6, p. 305, though, particularly the high expenditure in the manufacture and calibration of the antennas constitutes the main disadvantage of the monopulse technique. The additional demands placed by the double-target case on the precision of antenna geometry lead to a correspondingly high expenditure. When antenna geometry is not optimum, the above-described problems can be detected, particularly when the phase position between a directly received echo signal and the reflected one is close to 0° or 180°. In an employment in search or secondary radar systems, the resultant errors in the target angle determination would no longer be tolerable. This is confirmed, among other places, in S. M. Sherman, Monopulse Principles and Techniques, Artech House, Norwood, Mass., 1984, p. 340, by the conclusion that the diagonal difference signal (see loc. cit., pp. 74–75 with regard to the definition of this signal, which is also called the cross term signal) has no practical value for the determination of the spatial angle of one or two targets.

The object of the current invention, therefore, is to disclose a process and a radar device by means of which two flying objects can be precisely located and measured with regard to their position, independently of their positions within the radar beam. Instead of a second flying object, the second signal can also be a reflected signal from the first flying object.

This object is attained by means of the measures disclosed in claim 1 or 8. Advantageous embodiments of the invention are disclosed in further claims.

By means of the process according to the invention, the echo signals from two flying objects disposed in the antenna beam can be resolved and used for position determination of the flying objects in azimuth and elevation. The process according to the invention is suited as an extension of both amplitude and phase monopulse radar devices, which are used as search, tracking, or secondary radar devices. As a result, measurement errors are prevented that are a function of the position of the flying objects within the antenna beam. The shaping and disposition of the antenna horns or subantennas, which are provided according to the invention, and the evaluation of the signals transmitted by them can be realized with a relatively low expenditure. The region of unfavorable phase positions close to 0° or 180° between a directly received echo signal and the corresponding, indirectly reflected echo signal or the signal from a second target, which unfavorably influence the measurements, is sharply reduced by means of the process and device according to the invention. For search and secondary radar systems, it is particularly important that as a result, measurement errors can be completely prevented even when there are target offset positions perpendicular to the measurement axis.

By way of example, the invention is explained in detail below in conjunction with the drawings.

Figure 1:
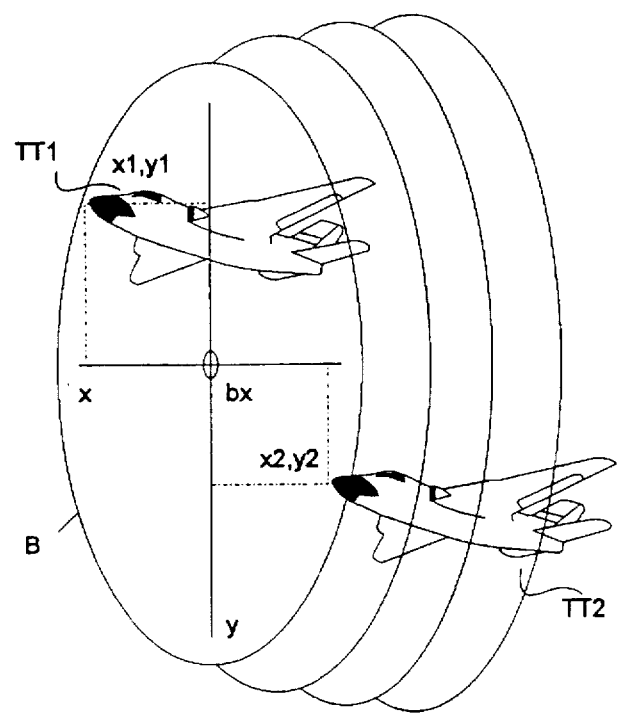
FIG. 1 shows two flying objects detected by an antenna beam.

The knowledge underlying the current invention is that in order to determine the offset angle of two flying objects detected simultaneously by the monopulse antenna in one dimension (measurement axis), at least three subantennas A, B, and Ω are required, whose signals are combined with one another in such a way that two functions $F1(x)$, $F2(x)$ that are linearly independent of each other are produced (x is the target offset position in the selected measurement dimension, e.g. azimuth), which are not affected by lateral offset positions of the flying objects detected, perpendicular to the measurement axis x. The resulting functions $F1(x)$ and $F2(x)$ (and therefore the subantennas, constituted, for example, by combinations of antenna elements, and the combination specification for their signals) must fulfill certain requirements described below.

For the case in which the process according to the invention is carried out in two measurement dimensions, it should be noted that the measurement axes x, y provided correspond with azimuth and elevation and can be perpendicular to each other. However, it is also possible, for example, that the measurement axes x, y provided enclose an acute angle and do not directionally correspond to either the azimuth or the elevation. Therefore the direction perpendicular to the first measurement axis x does not absolutely have to correspond to the direction of the second measurement axis y. In the exemplary embodiments indicated, unless expressly indicated, the measurement axes x and y are perpendicular to each other and are selected so that they correspond with azimuth and elevation respectively. The dimensions perpendicular to the measurement dimensions x and y are labeled below as sx and sy, respectively.

It has been determined that two functions which are independent of each other can be formed even if the radiated field patterns have the same amplitude and phase response perpendicular to the measurement plane and therefore the axes $bx_A$ and $bx_B$ and $bx_\omega$ of the subantennas A, B, and $\Omega$ are disposed in this measurement plane. In the extended amplitude monopulse process, the subantennas A, B, and $\Omega$ should receive the beams within the measurement plane in different directions (squint beams, which have an angle difference only within the measurement plane), and should have a common phase center or an identical phase response. In the extended phase monopulse process, the phase centers of the subantennas A, B, and $\Omega$ or of the corresponding subarrays, whose antenna beams are preferably transmitted parallel, are disposed on a straight line. In both processes, the sub-beams in planes perpendicular to the measurement plane should have the same direction and directional characteristic curve. It will be explained in a later section that the demand for phase monopulse radar devices can be fulfilled in a particularly simple way. The production of a cross term signal (cross difference) with signal components of antenna horns with associated radiation directions that are not disposed in the measurement plane, can therefore be eliminated. Thus lateral offset positions (perpendicular to the measurement plane) of the flying objects TT1, TT2 to be measured do not affect the measurement results obtained with regard to the measurement plane. Furthermore, the measurement is no longer rendered impossible in the event that one of the flying objects has the same offset position in the measurement axis as well as perpendicular to it.

The process proposed is now divided into two partial steps. First, two complex subsignals $F1_{ACT}$ and $F2_{ACT}$ which correspond to the functions $F1(x)$ and $F2(x)$, are obtained by means of a particularly weighted, normalized linear combination of the complex signals $a(x)$, $b(x)$ and $\omega(x)$ transmitted by the three subantennas A, B, and $\Omega$. Complex quantities that are shown underlined in this document, are always meant below to signify signals that are continuously sinusoidal as a function of time and are constant in frequency, or to signify proportions of such signals in a vector representation. They can be divided into two components (real and imaginary part or amplitude and phase). The functions $F1(x)$ and $F2(x)$ are selected in such a way that they are linearly independent of each other and in the single-target case, produce signals ($F1_{ACT}$ and $F2_{ACT}$), which are purely real or purely imaginary. Secondly, equations that contain the in-phase and the quadrature components of both complex signals $F1_{ACT}$ and $F2_{ACT}$ in the double-target case, as well as the functions $F1(x)$ and $F2(x)$ themselves, are solved with regard to the four unknowns contained in them.

So that two antenna functions $F1(x)$, $F2(x)$ are suited for the process according to the invention, these and the extended monopulse antenna must be chosen in such a way that:

requirement 1 in the single-target case, the quotients of the complex signals transmitted by the subantennas are perpendicular to the measurement plane or the measurement axis, independent of the target offset position.

requirement 2 the complex antenna functions $F1(x)$, $F2(x)$ defined for the single-target case are either purely real or purely imaginary, requirement 3 the antenna function pairs $F1(x)$, $F2(x)$ are linearly independent of each other, and requirement 4 the antenna function pairs $F1(x)$, $F2(x)$ are based upon a normalization by division with a common reference signal $Fs(x)$.

The following are defined for the description of the subject of the invention:

A, B, and $\Omega$: subantennas or subarrays comprised of antenna elements, used for the measurement in the first measurement dimension (e.g. azimuth)

C, D, and $\Omega$: subantennas or subarrays comprised of antenna elements, used for the measurement in the second measurement dimension (e.g. elevation)

$\Omega$: reference (sub)antenna ($\omega(x)$:=reference antenna function)

$a(x)$, $b(x)$, $\omega(x)$: antenna functions of the subantennas $\Omega$, A, . . . , D (in vector form), which are a function of target offset positions in a first measurement axis x $a2(x, sx,)$ . . . : antenna functions of the subantennas $\Omega$, A, . . . , D (in vector form), which are a function of target offset positions in a measurement axis x and an axis sx perpendicular to it $\Sigma\omega(x)$, $\Sigma a(x)$, . . . : amplitudes of the subantenna functions $a(x)$, $b(x)$, $\omega(x)$ $\phi\omega(x)$, $\phi a(x)$, . . . : phases of the subantenna functions $a(x)$, $b(x)$, $\omega(x)$ $\alpha(x)$, $\beta(x)$: phase difference $\phi a(x)-\phi\omega(x)$; $\phi b(x)-\phi\omega(x)$ $A(x)$, $B(x)$: normalized antenna signals $A(x)=a(x)/\omega(x)$; $B(x)=b(x)/\omega(x)$ e, h, r, t: constant weighting factors E, G, H, R, S, T: constant weighting factors (e, h, r, and t)→(E, H, R, and T)

$F1(x)$, $F2(x)$: purely real or purely imaginary selected first and second measurable antenna functions that can be measured for the single-target case and are obtained from the 3 subantenna signals by means of linear combination $FO1(x)$: characteristic function part of $F1(x)=FO1(x)/Fs(x)$ (numerator)

$FO2(x)$: characteristic function part of $F2(x)=FO2(x)/Fs(x)$ (numerator)

$Fs(x)$: reference signal $Fs(x):=E*a(x)+G*\omega(x)+H*b(x)$ (same for both functions $F1(x)$, $F2(x)$) (denominator)

$F1p(x)$, $F2p(x)$: real components of the functions $F1(x)$, $F2(x)$ $F1q(x)$, $F2q(x)$: quadrature or imaginary components of the functions $F1(x)$, $F2(x)$ $F1p_{ACT}$, $F2p_{ACT}$: real components of the signals actually measured in the double-target case in accordance with the established functions $F1(x)$, $F2(x)$ $F1q_{ACT}$, $F2q_{ACT}$: quadrature or imaginary components of the signals actually measured in the double-target case in accordance with the functions $F1(x)$, $F2(x)$ x1, x2: offset angle of two targets with reference to the bore sight axis in the first measurement dimension (e.g. azimuth)

y1, y2: offset angle of two targets with reference to the bore sight axis in the second measurement dimension (e.g. elevation)

ex1: the signal field intensity of the first target coming from the x1, y1 direction ex2: the signal field intensity of the second target coming from the x2, y2 direction $\rho$: reflection gradient or signal intensity ratio of two targets $\phi$: phase angle between the signals coming from the x1, y1 direction and the x2, y2 direction $F12(x1, x2, \rho, \phi)$: the first antenna function for the double-target case $F12p(x1, x2, \rho, \phi)$: real component of the first antenna function for the double-target case $F12q(x1, x2, \rho, \phi)$: imaginary component of the first antenna function for the double-target case $F22(x1, x2, \rho, \phi)$: the second antenna function for the double-target case F22p(x1, x2, ρ, φ): real component of the second antenna function for the double-target case F22q(x1, x2, ρ, φ): imaginary component of the second antenna function for the double-target case F12(y1, y2, ρ, φ): the first antenna function for the double-target case in a second measurement dimension F22(y1, y2, ρ, φ): the second antenna function for the double-target case in a second measurement dimension Fs(x1): composite or reference signal Fs(x1):=E*a(x1)+G*b(x1)+H*ω(x1) for the first target Fs(x2): composite or reference signal Fs(x2):=E*a(x2)+G*b(x2)+H*ω(x2) for the second target N: auxiliary factor (N(x1, x2, ρ)=ρ*Fs(x2)/Fs(x1))

The functions for the second measurement axis y are correspondingly labeled (F1(y), F2(y), etc.).

The two functions F1(x) and F2(x) that are independent of each other and are required for determining the position of the flying objects per measurement dimension (in this instance, in the x direction or in azimuth), are produced as follows:

The signals a2(x, sx), b2(x, sx), ω2(x, sx) that are transmitted by the subantennas A, B, and Ω of an extended monopulse antenna are generally a function of the position x of a flying object with regard to the measurement dimension and the position sx perpendicular to it. Using the weighting factors r, S, t, e, G, and h, which are selected as constants and can also assume negative values, the following quotient of weighted combinations is produced:

$$f(x, sx) = \frac{r * \underline{a2}(x, sx) + S * \underline{\omega 2}(x, sx) + t * \underline{b2}(x, sx)}{e * \underline{a2}(x, sx) + G * \underline{\omega 2}(x, sx) + h * \underline{b2}(x, sx)} \quad \text{formula 1}$$

It is now required that the radiated field patterns of subantennas A, B, and Ω have the same amplitude and phase response perpendicular to the measurement plane. After being divided into a component of the subantenna functions a2(x, sx), b2(x, sx), and ω2(x, sx) that is a function of x and (perpendicular to it) a component that is a function of sx, the following is true:

$$\frac{\underline{a2}(x, sx)}{\underline{\omega 2}(x, sx)} = \frac{\underline{a}(x) * \underline{a22}(sx)}{\underline{\omega}(x) * \underline{\omega 22}(sx)} = \quad \text{formula 1a}$$

$$\frac{\underline{a}(x)}{\underline{\omega}(x)} * \frac{\underline{a22}(sx)}{\underline{\omega 22}(sx)} = \frac{\underline{a}(x)}{\underline{\omega}(x)} * KA \text{ and}$$

$$\frac{\underline{b2}(x, sx)}{\underline{\omega 2}(x, sx)} = \frac{\underline{b}(x) * \underline{b22}(sx)}{\underline{\omega}(x) * \underline{\omega 22}(sx)} = \quad \text{formula 1b}$$

$$\frac{\underline{b}(x)}{\underline{\omega}(x)} * \frac{\underline{b22}(sx)}{\underline{\omega 22}(sx)} = \frac{\underline{b}(x)}{\underline{\omega}(x)} * KB \text{ and}$$

These expressions should only be a function of target deviations x along the measurement axis. The antenna function ω2(x, sx) was arbitrarily used for normalization. This subantenna function ω2(x, sx) as well as ω(x) is therefore described as the reference function and the subantenna Ω is described as the reference antenna.

The two quotients KA and KB remain unaffected by target offset positions sx perpendicular to the measurement axis and are therefore constant. The fraction in formula 1 is now reduced by ω2(x, sx) and the formulas 1a, 1b are inserted. The weighting factors r, t, e, and h are then replaced in the resultant formula by the factors R=r*KA, E=e*KA, T=t*KB, and H=h*KB. For the further derivations, these are assumed to be real since functions are therefore produced which can be used according to the invention. As a result, in lieu of the subantenna functions a2(x, sx), b2(x, sx), and ω2(x, sx), then the subantenna functions a(x), b(x), and ω(x) appear, which are a function of x only.

Therefore, for the measurement of angle offset positions x in the measurement dimension, which measurement is independent of the offset position sx perpendicular to the measurement axis, the following is true:

$$f(x, sx) = \underline{F}(x) = \frac{R * \frac{\underline{a}(x)}{\underline{\omega}(x)} + S + T * \frac{\underline{b}(x)}{\underline{\omega}(x)}}{E * \frac{\underline{a}(x)}{\underline{\omega}(x)} + G + H * \frac{\underline{b}(x)}{\underline{\omega}(x)}} \quad \text{formula 2}$$

A normalization of the subantenna functions a(x) and b(x) with ω(x) produces the quotients A(x) and B(x), which are independent of offset positions in the dimension sx:

$$\underline{A}(x) = \underline{a}(x)/\underline{\omega}(x) \quad \text{formula 3a}$$

$$\underline{B}(x) = \underline{b}(x)/\underline{\omega}(x) \quad \text{formula 3b}$$

The insertion of A(x) and B(x) into formula 2 produces the following antenna function that is independent of offset positions in the dimension sx:

$$\underline{F}(x) = \frac{R * \underline{A}(x) + S + T * \underline{B}(x)}{E * \underline{A}(x) + G + H * \underline{B}(x)} \quad \text{formula 4}$$

An antenna function F(x) suited to the process according to the invention is therefore a normalized linear combination of at least three subantenna functions, which fulfill the above-mentioned requirements (requirement 1). The vectorial signals of the subantenna functions a(x), b(x), and ω(x) are represented below by their amplitude and phase position:

$\underline{\omega}(x)$: $\Sigma\omega(x)$ is the amplitude of $\underline{\omega}(x)$;
$\phi\omega(x)$ is the phase of $\underline{\omega}(x)$ $\underline{a}(x)$: $\Sigma a(x)$ is the amplitude of $\underline{a}(x)$;
$\phi a(x)$ is the phase of $\underline{a}(x)$ $\underline{b}(x)$: $\Sigma b(x)$ is the amplitude of $\underline{b}(x)$;
$\phi b(x)$ is the phase of $\underline{b}(x)$ For the sake of simplicity, the phase positions of the subantenna functions a(x) and b(x) are applied to the phase position of the reference function ω(x):

The phase difference between a(x) and ω(x) is: α(x)=φa(x)−φω(x)

The phase difference between b(x) and w(x) is: β(x)=φb(x)−φω(x)

The amplitudes Σω(x), Σa(x), and Σb(x); the phases φω(x), φa(x), and φb(x); or α(x) and β(x) are a function of the target offset position in the measurement axis x. The vectorial quotients A(x) and B(x) can consequently be represented by their length and phase position:

$$\underline{A}(x) = \frac{\Sigma a(x)}{\Sigma \omega(x)} * e^{j\alpha} \quad \text{formula 5a}$$

$$\underline{B}(x) = \frac{\Sigma b(x)}{\Sigma \omega(x)} * e^{j\beta} \quad \text{formula 5b}$$

Inserted in formula 4, this produces:

$$\underline{F}(x) = \frac{R * \frac{\Sigma a(x)}{\Sigma \omega(x)} * e^{j\alpha} + S + T * \frac{\Sigma b(x)}{\Sigma \omega(x)} * e^{j\beta}}{E * \frac{\Sigma a(x)}{\Sigma \omega(x)} * e^{j\alpha} + G + H * \frac{\Sigma b(x)}{\Sigma \omega(x)} * e^{j\beta}} \quad \text{formula 6}$$

This function can be divided into real and imaginary parts:

$$\underline{F}(x) = Fp(x) + jFq(x) \quad \text{formula 7}$$

Conversions which suggest themselves permit the real part Fp(x) and imaginary part Fq(x) to be determined:

With $NP = E \frac{\Sigma a(x)}{\Sigma \omega(x)} \cos(\alpha) + G + H \frac{\Sigma b(x)}{\Sigma \omega(x)} \cos(\beta)$ formula 8a $NQ = E \frac{\Sigma a(x)}{\Sigma \omega(x)} \sin(\alpha) + H \frac{\Sigma b(x)}{\Sigma \omega(x)} \sin(\beta)$, formula 8b $ZP = R \frac{\Sigma a(x)}{\Sigma \omega(x)} \cos(\alpha) + S + T \frac{\Sigma b(x)}{\Sigma \omega(x)} \cos(\beta)$, formula 8c and $ZQ = R \frac{\Sigma a(x)}{\Sigma \omega(x)} \sin(\alpha) + T \frac{\Sigma b(x)}{\Sigma \omega(x)} \sin(\beta)$, formula 8d then the following are true:

$$Fp(x) = \frac{NP * ZP + NQ * ZQ}{NP^2 + NQ^2}$$ formula 9a $$Fq(x) = \frac{NP * ZQ + NQ * ZP}{NP^2 + NQ^2}$$ formula 9b Since it has been determined above that the functions F1(x), F2(x) should be either purely real or purely imaginary, either the numerator of the real part Fp(x) or the numerator of the imaginary part Fq(x) must be set equal to zero by means of suitable measures. For this purpose, NP and NQ may not be set equal to zero because otherwise, both the real part Fp(x) and the imaginary part Fq(x) would equal zero at the same time. If F(x) is intended to be pure (purely real or purely imaginary), then four cases are possible in accordance with the equations G11, . . . , G22:

$F(x)$ real $(Fp(x) \neq 0, Fq(x) = 0)$:

$ZQ = 0, ZP \neq 0, NQ = 0,$ and $NP \neq 0; Fp(x) = ZP/NP$ equation G11

$ZQ \neq 0, ZP = 0, NQ \neq 0,$ and $NP = 0; Fp(x) = ZQ/NQ$ equation G12

$F(x)$ imaginary $(Fp(x) = 0, Fq(x) \neq 0)$:

$ZQ \neq 0, ZP = 0, NQ = 0,$ and $NP \neq 0; Fq(x) = ZQ/NP$ equation G21

$ZQ = 0, ZP = 0, NQ \neq 0,$ and $NP = 0; Fq(x) = ZP/NQ$ equation G22

The equations G12 and G22 produce functions with poles that are unfavorable for a further processing. Equations G11 and G21 are therefore of practical significance. For each of the functions F1(x) and F2(x), either equation G11 or equation G21 must therefore be fulfilled.

Figure 2:
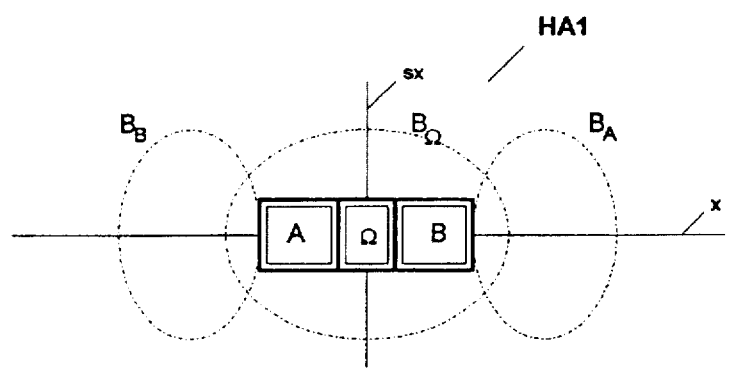
FIG. 2 shows a section through the beams of an amplitude monopulse antenna with three horns

For the extended amplitude monopulse process, which can be carried out using the antenna system shown in FIG. 2, for example, the following is true:

The functions a(x) and b(x) of elements A and B should not differ with regard to phase from the phase of function $\omega(x)$ of the reference element $\Omega$: $\phi a(x) = \phi b(x) = \phi \omega(x)$ and $\alpha(x) = \beta(x) = 0$. All subantennas A, B, and $\Omega$ should ideally have the same phase center, independent of the target direction x. As a result, equation G11 is always fulfilled independent of the choice of the weighting factors: Fq(x)=0, ZQ=0, ZP≠0, NQ=0, and NP≠0. The fulfilling of equation G11 by inserting formulas 8a and 8c into formula 9a produces the following formula for Fp(x)=FP$_A$(X). The weighting factors R, S, T, E, G, and H can be freely chosen for the functions F1(x) and F2(x) in the following formula, in which the affiliation to the amplitude monopulse process is indicated by the index A.

$$F_{PA}(x) = \frac{R * \frac{\Sigma a(x)}{\Sigma \omega(x)} + S + T * \frac{\Sigma b(x)}{\Sigma \omega(x)}}{E * \frac{\Sigma a(x)}{\Sigma \omega(x)} + G + H * \frac{\Sigma b(x)}{\Sigma \omega(x)}}$$ formula 10

Through the choice of suitable weighting factors R, S, T, E, G, and H, a desired disposition and characteristic curve of the subantennas A, B, and $\Omega$ can be taken into account. In lieu of Fp$_A$(X), only F$_A$(X) is written.

With the preferred symmetry conditions R/T=−1, E/H=1, S=0, $\Sigma a(-x) = \Sigma b(x)$, $\Sigma \omega(-x) = \Sigma \omega(x)$, the following is produced for a first function F1$_A$(x):

$$F1_A(x) = \frac{R * \left( \frac{\Sigma a(x)}{\Sigma \omega(x)} - \frac{\Sigma a(-x)}{\Sigma \omega(-x)} \right)}{E * \left( \frac{\Sigma a(x)}{\Sigma \omega(x)} + \frac{\Sigma a(-x)}{\Sigma \omega(-x)} \right) + G}$$ formula 11

According to formula 11, it can be clearly seen that F1$_A$(x)=−F1$_A$(x). Therefore F1$_A$(x) is an odd function.

Furthermore, the following are preferred symmetry conditions:

$R/T = 1, E/H = 1, \Sigma a(-x) = \Sigma b(x), \Sigma \omega(-x) = \Sigma \omega(x)$, and $$\frac{S}{R} = -2 * \frac{\Sigma a(0)}{\Sigma \omega(0)}$$

As a result, the bore sight axis becomes the symmetry axis for the graph of element pair A, B as well as the symmetry axis for the graph of the reference element $\Omega$. At the same time, F2$_A$(0) becomes equal to zero on the bore sight axis. These symmetry conditions lead to the second function F2$_A$(x):

$$F2_A(x) = \frac{R * \left( \frac{\Sigma a(x)}{\Sigma \omega(x)} + \frac{\Sigma a(-x)}{\Sigma \omega(-x)} - 2 * \frac{\Sigma a(0)}{\Sigma \omega(0)} \right)}{E * \left( \frac{\Sigma a(x)}{\Sigma \omega(x)} + \frac{\Sigma a(-x)}{\Sigma \omega(-x)} \right) + G}$$ formula 12

According to formula 12, it can be clearly seen that F2$_A$(x)=F2$_A$(−x). Therefore F2$_A$(x) is an even function.

In the selection of weighting factors, it should be noted that the independence of both functions F1(x) and F2(x) remains assured. The functions F1(x) and F2(x), however, are always independent of each other if one is odd (e.g. F1(x)) and the other is even (F2(x)). Since of the two functions F1$_A$(x) and F2$_A$(x) disclosed by way of example for the amplitude monopulse process, the first is odd and the second is even, in addition to requirements 1 and 2, requirement 3 mentioned at the beginning is also fulfilled in accordance with the independence of the functions F1$_A$(x) and F2$_A$(x). Since the functions F1$_A$(x) and F2$_A$(x) have the same denominator, requirement 4 is also fulfilled.

Figure 7:
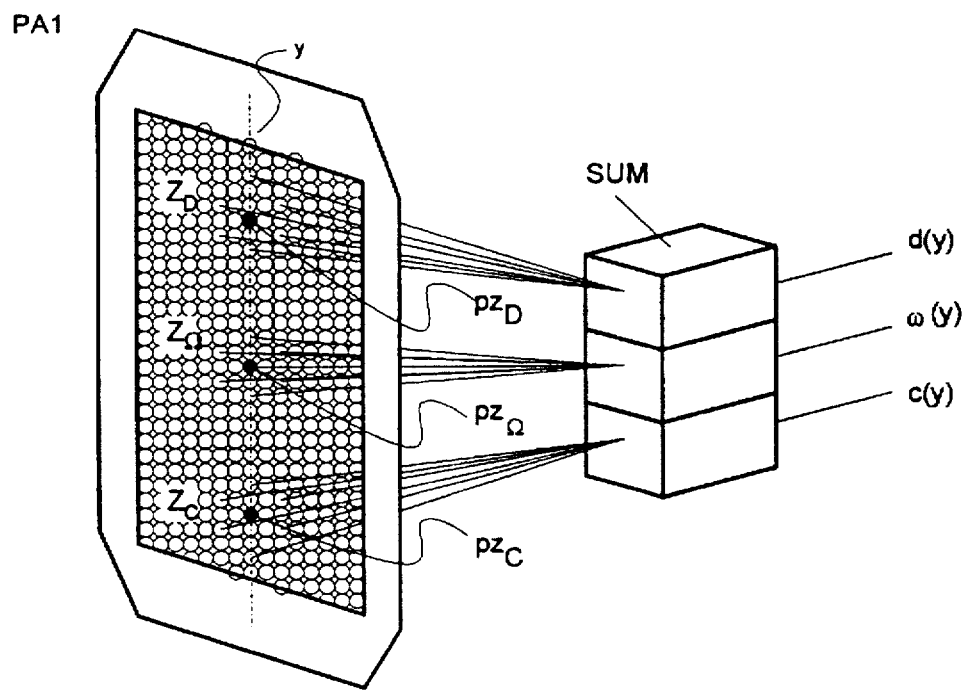
FIG. 7 shows a phased array antenna within which three subantennas are constituted.
Figure 8:
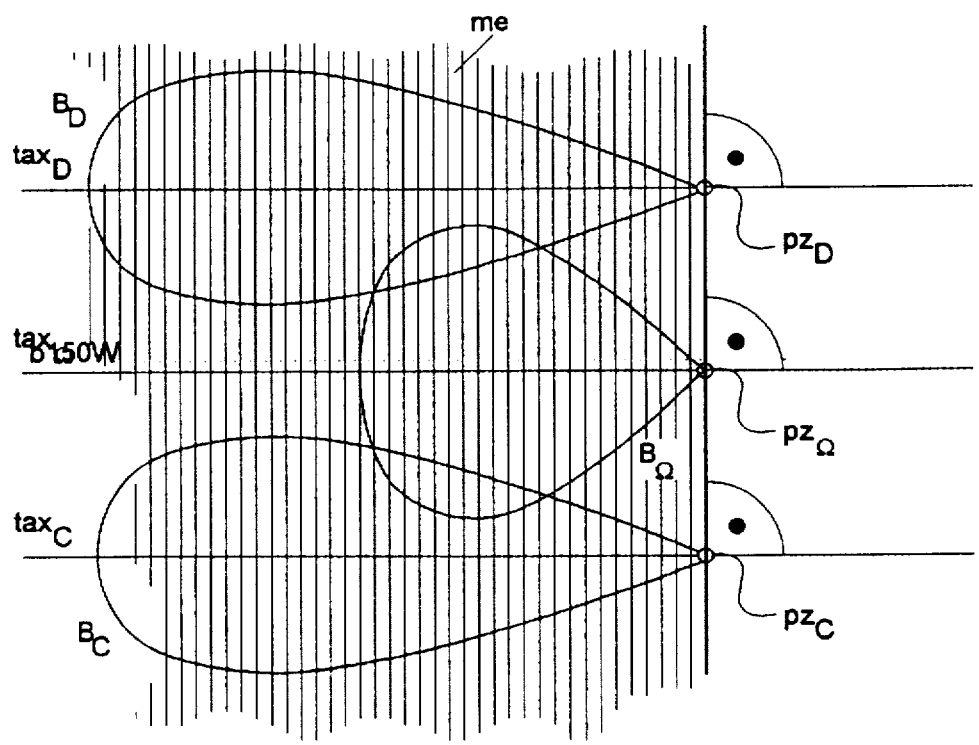
FIG. 8 shows the antenna beams of a phase monopulse antenna, e.g. a phased array antenna according to FIG. 7.

The following is true for the extended phase monopulse process:

FIG. 7 shows an extended phase monopulse antenna PA1, which can be used in a particularly advantageous way for the process according to the invention since antenna elements AE of the phased array antenna PA can be selected without difficulties in such a way that subantennas $\Omega$, C, D are constituted, whose phase centers are disposed on a straight line and whose main radiation axes tax$_c$, tax$_D$, and tax$_\Omega$, as shown in FIG. 8, are disposed in a plane parallel to each other. The zones $Z_\Omega$, $Z_c$, and $Z_D$, whose phase centers are to be disposed according to the invention, are selected for example as in FIG. 7. The antenna PA1 is used for example to measure objects in elevation. For the additional measurement of the position of the objects in azimuth, further subantennas A, B, or zones $Z_A$, $Z_B$ must be provided, whose phase centers are disposed on another straight line, which is disposed for example orthogonal to the first straight line on which the phase centers of subantennas $\Omega$, C, D are disposed. The phase centers of subantennas A and B should additionally have the same distance from the phase center of the subantenna Q that is disposed in the center.

According to E. Brookner, loc. cit. 5.5.3, pp. 318–319, the signals received by subantennas of a phase monopulse radar device, which signals have been reflected by a flying object TT disposed outside the bore sight axis, have unequal phases and equal amplitudes. In the classic amplitude and phase monopulse radar device, the difference signals have a phase difference of 0° for amplitude monopulse or 90° for phase monopulse with regard to the composite signals. Correspondingly, this fact must likewise be taken into account in the formation of formulas for extended monopulse radar devices.

The functions a(x) and b(x) of elements A and B should not differ from each other with regard to amplitude response ($\Sigma a(x)=\Sigma b(x)$). This means that the subantennas A and B must have the same amplitude response or must have the same antenna pattern in the measurement axis. Furthermore, the following should be true: $\Sigma a(x)=\Sigma a(-x)$, $\Sigma b(x)=\Sigma b(-x)$, and $\Sigma \omega(x)=\Sigma \omega(-x)$. This condition is fulfilled when the main radiation directions of the three subantennas A, B, and $\Omega$ are disposed parallel to each other and perpendicular to a straight line on which the phase centers of subantennas A, B, and $\Omega$ are disposed.

In addition, the following condition should be met: $\alpha(x) = -\beta(x)$. This condition is fulfilled when the subantenna $\Omega$ and thereby its phase center is disposed precisely in the center between the phase centers of subantennas A and B. These conditions can be fulfilled relatively simply in comparison to the amplitude monopulse process in which all subantennas A, B, and $\Omega$ should have the same phase center. By taking these conditions into account and correspondingly selecting the weighting factors E, G, H, R, S, and T in formulas 8a to 8d, either equation G11 or G21 is fulfilled. The index $\phi$ is used to identify the functions of the phase monopulse process.

To fulfill the equation G21, preferably the following are true: $R/T=-1$, $E/H=1$, and $S=0$. Therefore the following are true: $Fp(x)=0$, $ZQ\neq 0$, $ZP=0$, $NQ=0$, and $NP\neq 0$. The fulfillment of equation G21 and the insertion of formulas 8a and 8d into formula 9b produces the following formula for $j*Fq(x)=F1_\phi(x)$ $$F1_\phi(x) = j * \frac{2 * R * \frac{\Sigma a(x)}{\Sigma \omega(x)} * \sin(\alpha(x))}{2 * E * \frac{\Sigma a(x)}{\Sigma \omega(x)} * \cos(\alpha(x)) + G} \qquad \text{formula 13}$$

The function $F1_\phi(x)$ according to formula 13 is therefore odd and imaginary.

To fulfill equation G11, preferably $R/T=E/H=1$ and additionally the following is true:

$$\frac{S}{R} = -2 * \frac{\Sigma a(0)}{\Sigma \omega(0)}.$$

Therefore: $Fq(x)=0$, $ZQ=0$, $ZP\neq 0$, $NQ=0$, and $NP\neq 0$. The fulfillment of equation G11 and the insertion of formulas 8a and 8c into formula 9a produces the following formula for $Fp(x)=F2_\phi(x)$:

$$F2_\phi(x) = \frac{2 * R * \frac{\Sigma a(x)}{\Sigma \omega(x)} * \cos(\alpha(x)) - 1)}{2 * E * \frac{\Sigma a(x)}{\Sigma \omega(x)} * \cos(\alpha(x)) + G} \qquad \text{formula 14}$$

The function $F2_\phi(x)$ according to formula 14 is therefore even and real, since $\alpha(x)$ is odd. At the same time, it becomes zero on the bore sight axis (x=0).

The odd function $F1_\phi(x)$ and the even function $F2_\phi(x)$ are linearly independent of each other.

Figure 10:
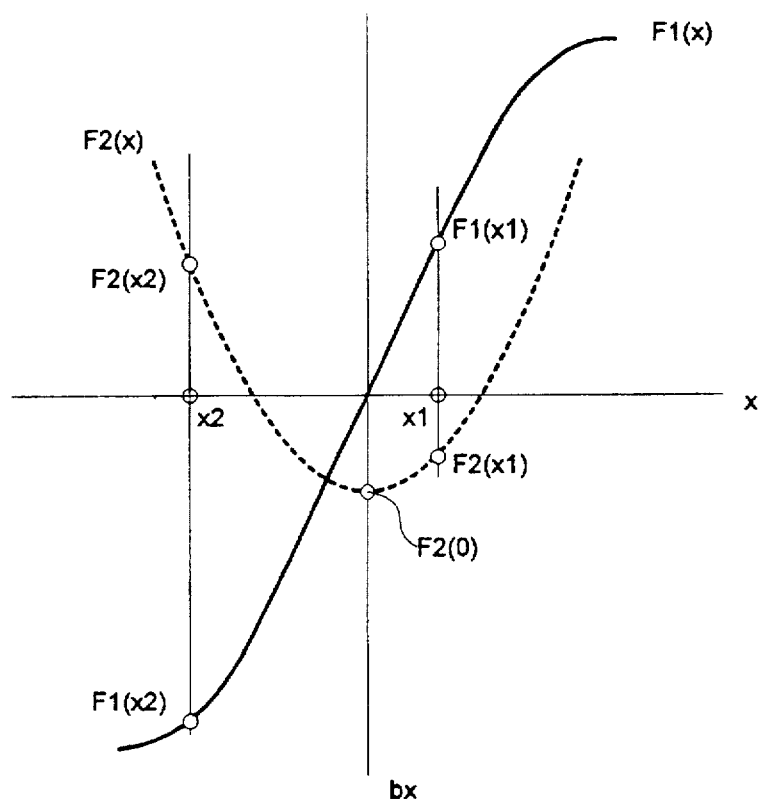
FIG. 10 shows a graph of two functions that are formed by the combination of the signals transmitted by an extended monopulse antenna.
Figure 16:
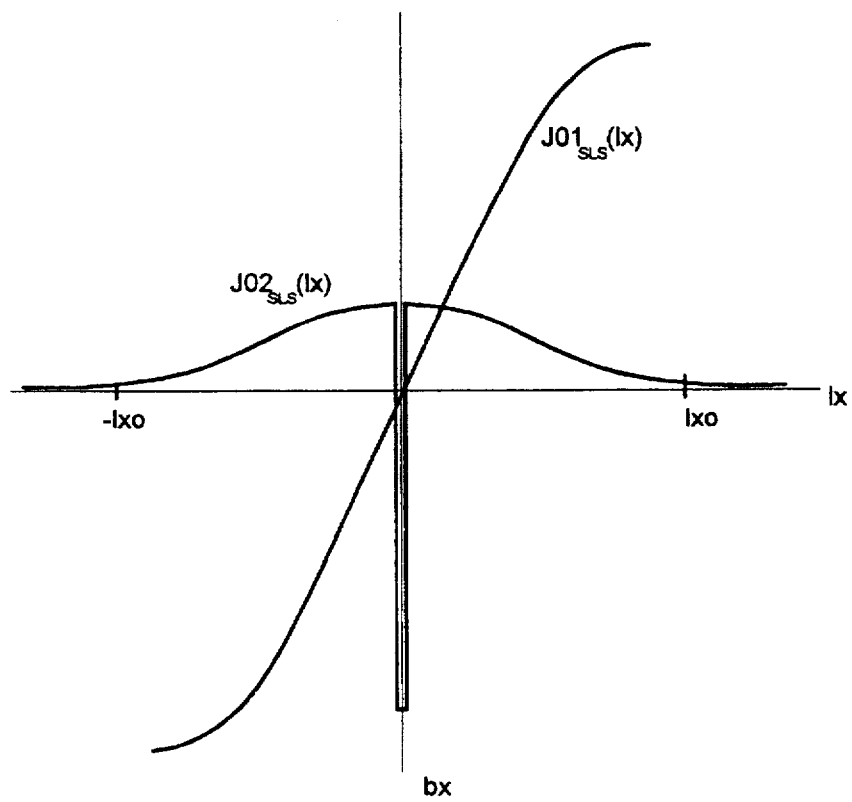
FIG. 16 shows the graph of the illumination functions JO1, JO2, realized with an SLS antenna.

The antenna function pair ($F1_A(x)$, $F2_A(x)$ or $F1_\phi(x)$, $F2_\phi(x)$), which fulfills the requirements 1, 2, 3, and 4, is measured for the single-target case. The function values ascertained are stored in a memory. FIG. 10 shows measured function curves for antenna functions F1(x), F2(x) determined by way of example. Furthermore, the values of the antenna functions F1(x), F2(x) are marked in at points x1 and x2, at which the flying objects TT1, TT2 are located.

Formula 2, extended by $\omega(x)$ and used in F1(x), produces the following:

$$\underline{F1}(x) = \frac{R1 * \underline{a}(x) + S1 * \underline{\omega}(x) + T1 * \underline{b}(x)}{E * \underline{a}(x) + G * \underline{\omega}(x) + H * \underline{b}(x)} \qquad \text{formula 15}$$

The coefficients R, S, or T selected for the first function F1(x) are labeled R1, S1, and T1. A target from direction x generates the field intensity ex. Formula 15, extended by ex produces:

$$\underline{F1}(x) = \frac{R1 * \underline{a}(x) * ex + S1 * \underline{\omega}(x) * ex + T1 * \underline{b}(x) * ex}{E * \underline{a}(x) * ex + G * \underline{\omega}(x) * ex + H * \underline{b}(x) * ex} = \qquad \text{formula 16}$$

$$\frac{F01(x) * ex}{Fs(x) * ex} = \frac{Z1}{No}$$

Then the expression a(x)*ex is the signal produced at the output of subantenna A as a result of the field intensity ex of the target from the x direction. The same is true for the subantennas B and $\Omega$. As a result, the entire numerator signal Z1 generated on the basis of ex from the weighted sum is disposed in the numerator of the expression according to formula 16, just as the denominator signal No is disposed in the denominator. Correspondingly, the following is true for the second function F2(x), which has the same denominator signal No as the first function F1(x):

$$\underline{F2}(x) = \frac{R2 * \underline{a}(x) * ex + S2 * \underline{\omega}(x) * ex + T2 * \underline{b}(x) * ex}{E * \underline{a}(x) * ex + G * \underline{\omega}(x) * ex + H * \underline{b}(x) * ex} = \qquad \text{formula 17}$$

$$\frac{F02(x) * ex}{Fs * ex} = \frac{Z2}{No}$$

If only a single object is disposed in the radar beam (single-target case), then its position x in the first measurement dimension x (and analogously in a device with two measurement dimensions, in the second measurement dimension y) can be determined according to the classic monopulse process.

In the double-target case, the signal values $F1_{ACT}$ and $F2_{ACT}$ ascertained in the radar device according to these formulas are complex and no longer correspond to the values assumed for the single-target case. In addition to the pure signal components, e.g. $F1p_{ACT}$, $F2p_{ACT}$, for example quadrature signal components $F1q_{ACT}$, $F21_{ACT}$ appear, which must be taken into account for the correct position determination of the two flying objects. The signals produced are derived below:

The signals with the field intensities ex1 and ex2 are received from two targets from the directions x1 and x2, which signals are phase shifted by the angle $\phi$ and have signal intensities that differ by the factor $\rho$. The field intensity ex2 is therefore: $ex2=ex1*\rho*e^{j\phi}$. Since the signals received from the two objects overlap in both the numerator function and denominator function, the following functions are produced for the double-target case:

$$\underline{F12}(x1, x2, \rho, \phi) = \frac{Z11 + Z12}{N1o = N2o} \quad \text{formula 101a}$$

$$\underline{F22}(x1, x2, \rho, \phi) = \frac{Z21 + Z22}{N1o = N2o} \quad \text{formula 101b}$$

With $\underline{Z11} = \underline{F01}(x1) * \underline{ex1}, \quad \underline{Z12} = \underline{F01}(x2) * \underline{ex2} = \underline{F01}(x2) * \underline{ex1} * \rho * e^{j\phi},$ $\underline{Z21} = \underline{F02}(x1) * \underline{ex1}, \quad \underline{Z12} = \underline{F02}(x2) * \underline{ex2} = \underline{F02}(x2) * \underline{ex1} * \rho * e^{j\phi},$ $\underline{N1o} = \underline{Fs}(x1) * \underline{ex1},$ and $\underline{N2o} = \underline{Fs}(x2) * \underline{ex2} = \underline{Fs}(x2) * \underline{ex1} * \rho * e^{j\phi}$ the following is produced by insertion into formulas 101a and 101b:

$$\underline{F12}(x1, x2, \rho, \phi) = \frac{\underline{F01}(x1) * \underline{ex1} + \underline{F01}(x2) * \underline{ex1} * \rho * e^{j\phi}}{\underline{Fs}(x1) * \underline{ex1} + \underline{Fs}(x2) * \underline{ex1} * \rho * e^{j\phi}} \quad \text{formula 102a}$$

$$\underline{F22}(x1, x2, \rho, \phi) = \frac{\underline{F02}(x1) * \underline{ex1} + \underline{F02}(x2) * \underline{ex1} * \rho * e^{j\phi}}{\underline{Fs}(x1) * \underline{ex1} + \underline{Fs}(x2) * \underline{ex1} * \rho * e^{j\phi}} \quad \text{formula 102b}$$

Replacing the function parts F01(x) and F02(x) with the antenna functions F1(x) and F2(x) according to formulas 16 and 17 and reducing by ex1 produces:

$$\underline{F12}(x1, x2, \rho, \phi) = \frac{\underline{F1}(x1) * \underline{Fs}(x1) + \rho * e^{j\phi} * \underline{F1}(x2) * \underline{Fs}(x2)}{\underline{Fs}(x1) + \rho * e^{j\phi} * \underline{Fs}(x2)} \quad \text{formula 103}$$

$$\underline{F22}(x1, x2, \rho, \phi) = \frac{\underline{F2}(x1) * \underline{Fs}(x1) + \rho * e^{j\phi} * \underline{F2}(x2) * \underline{Fs}(x2)}{\underline{Fs}(x1) + \rho * e^{j\phi} * \underline{Fs}(x2)} \quad \text{formula 104}$$

The insertion of $N(x1, x2, \rho)*Fs(x1)/Fs(x2)$ in lieu of $\rho$ produces:

$$\underline{F12}(x1, x2, \rho, \phi) = \frac{\underline{F1}(x1) * \underline{Fs}(x1) + N * e^{j\phi} * \underline{F1}(x2) * \underline{Fs}(x1)}{\underline{Fs}(x1) + N * e^{j\phi} * \underline{Fs}(x1)} \quad \text{formula 105}$$

$$\underline{F22}(x1, x2, \rho, \phi) = \frac{\underline{F2}(x1) * \underline{Fs}(x1) + N * e^{j\phi} * \underline{F2}(x2) * \underline{Fs}(x1)}{\underline{Fs}(x1) + N * e^{j\phi} * \underline{Fs}(x1)} \quad \text{formula 106}$$

Reducing by Fs(x1) produces:

$$\underline{F12}(x1, x2, \rho, \phi) = \frac{\underline{F1}(x1) + N * e^{j\phi} * \underline{F1}(x2)}{1 + N * e^{j\phi}} \quad \text{formula 107}$$

$$\underline{F22}(x1, x2, \rho, \phi) = \frac{\underline{F2}(x1) + N * e^{j\phi} * \underline{F2}(x2)}{1 + N * e^{j\phi}} \quad \text{formula 108}$$

The complex functions F1(x) and F2(x) are now decomposed into their real and imaginary components (p and q):

$F1(x1)=F1p(x1)+j*F1q(x1)$ formula 109a $F1(x2)=F1p(x2)+j*F1q(x2)$ formula 109b $F2(x1)=F2p(x1)+j*F2q(x1)$ formula 110a $F2(x2)=F2p(x2)+j*F2q(x2)$ formula 110b Therefore the following is true for the functions F12(x1, x2, $\rho$, $\phi$) and F22(x1, x2, $\rho$, $\phi$):

$$\underline{F12}(x1, x2, \rho, \phi) = \quad \text{formula 111}$$

$$\frac{(F1p(x1)+j*F1q(x1)) + N*e^{j\phi}*(F1p(x2)+j*F1q(x2))}{1 + N*e^{j\phi}}$$

$$\underline{F22}(x1, x2, \rho, \phi) = \quad \text{formula 112}$$

$$\frac{(F2p(x1)+j*F2q(x1)) + N*e^{j\phi}*(F2p(x2)+j*F2q(x2))}{1 + N*e^{j\phi}}$$

The decomposition of the complex functions F12(x1, x2, $\rho$, $\phi$) and F22(x1, x2, $\rho$, $\phi$) correspondingly reads:

$F12(x1, x2, \rho, \phi)=F12p(x1, x2, \rho, \phi)+j*F12q(x1, x2, \rho, \phi):=$
$F1p_{ACT}+j*F1q_{ACT}$ formula 113

$F22(x1, x2, \rho, \phi)=F22p(x1, x2, \rho, \phi)+j*F22q(x1, x2, \rho, \phi):=$
$F2p_{ACT}+j*F2q_{ACT}$ formula 114

Since in formulas 113 and 114, the real ratios, i.e. the appearance of a second target is taken into account, the real and imaginary parts F12p(x1, x2, $\rho$, $\phi$), F12q(x1, x2, $\rho$, $\phi$), F22p(x1, x2, $\rho$, $\phi$), and F12q(x1, x2, $\rho$, $\phi$), now correspond to the signal values $F1p_{ACT}$, $F2p_{ACT}$, $F1q_{ACT}$ and $F2_{ACT}$ actually measured (or formed in quadrature channels), which values are constituted from the signals that are transmitted by the subantennas A, B, $\Omega$ and are correspondingly weighted and combined.

The signal values $F1p_{ACT}$, $F2p_{ACT}$, $F1q_{ACT}$ and $F2q_{ACT}$ are therefore equal to the real and imaginary parts F12p(x1, x2, $\rho$, $\phi$), F12q(x1, x2, $\rho$, $\phi$), F22p(x1, x2, $\rho$, $\phi$), and F22q(x1, x2, $\rho$, $\phi$) of the functions F12(x1, x2, $\rho$, $\phi$) and F22(x1, x2, $\rho$, $\phi$). By transformation, now these real and imaginary parts F12p(x1, x2, $\rho$, $\phi$), F12q(x1, x2, $\rho$, $\phi$), F22p(x1, x2, $\rho$, $\phi$), and F22q(x1, x2, $\rho$, $\phi$) are defined in detail.

Since it has been determined above that the functions F1(x), F2(x) should be either purely real or purely imaginary and the weighting factors E, G, H, R, S, and T have been correspondingly selected, for each function F1(x) or F2(x), either the real part F1p(x), F2p(x) or the imaginary part F1q(x), F2q(x) can be set equal to zero. The corresponding components must therefore be set equal to zero in formulas 111 and 112.

For extended amplitude monopulse devices, for both functions F1(x) and F2(x), equation G11 is fulfilled so that F1q(x) and F2q(x) are set equal to zero (therefore F1(x1)= F1p(x1), F1(x2)=F1p(x2), F2(x1)=F2p(x1), and F2(x2)= F2p(x2)). For $F1p_{ACT}$, $F1q_{ACT}$ or $F2p_{ACT}$, $F2q_{ACT}$, in this case, the following are true:

$$F1p_{ACT} = \frac{F1(x1) + N*\cos\phi*(\underline{F1}(x1) + \underline{F1}(x2)) + N^2*\underline{F1}(x2)}{1 + 2*N*\cos\phi + N^2} \quad \text{formula 115p}$$

$$F1q_{ACT} = \frac{(\underline{F1}(x2) - \underline{F1}(x1))*N*\sin\phi}{1 + 2*N*\cos\phi + N^2} \quad \text{formula 116p}$$

$$F2p_{ACT} = \frac{F2(x1) + N*\cos\phi*(\underline{F2}(x1) + \underline{F2}(x2)) + N^2*\underline{F2}(x2)}{1 + 2*N*\cos\phi + N^2} \quad \text{formula 117p}$$

$$F2q_{ACT} = \frac{(\underline{F2}(x2) - \underline{F2}(x1))*N*\sin\phi}{1 + 2*N*\cos\phi + N^2} \quad \text{formula 118p}$$

If equation G21 is fulfilled for function F1(x) and equation G11 is fulfilled (phase monopulse) for function F2(x), and therefore F1p(x) and F2p(x) are set equal to zero, (F1(x1)=j*F1q(x1), F1(x2)=j*F1q(x2), F2(x1)=F2p(x1), and F2(x2)=F2p(x2)), then the following is true for $F1p_{ACT}$, F1q$_{ACT}$ or F2p$_{ACT}$ and F2q$_{ACT}$:

$$F1p_{ACT} = j * \frac{(F1(x2) - F1(x1)) * N * \sin\phi}{1 + 2 * N * \cos\phi + N^2} \quad \text{formula 115q}$$

$$F1q_{ACT} = -j * \frac{(F1(x1) + N * \cos\phi * F1(x1) + F1(x2)) + N^2 * F1(x2)}{1 + 2 * N * \cos\phi + N^2} \quad \text{formula 116q}$$

$$F2p_{ACT} = \frac{F2(x1) + N * \cos\phi * (F2(x1) + F2(x2)) + N^2 * F2(x2)}{1 + 2 * N * \cos\phi + N^2} \quad \text{formula 117q}$$

$$F2q_{ACT} = \frac{(F2(x1) - F2(x2)) * N * \sin\phi}{1 + 2 * N * \cos\phi + N^2} \quad \text{formula 118q}$$

By using formulas 115p to 118p and replacing F1(x) and F2(x) with F1$_A$(x) and F2$_A$((x) (for amplitude monopulse), it can be proven that for x=x1 and x=x2, the following proportion is true for the values x1 and x2:

$$\frac{F1_A(x) - F1_{APACT}}{F1_{AqACT}} = \frac{F2_A(x) - F2_{APACT}}{F2_{AqACT}} \quad \text{formula 119a}$$

By using formulas 115q to 118q and replacing F1(x) and F2(x) with F1$_\phi$(x) and F2$_\phi$(x) (for phase monopulse), it can be proven that for x=x1 and x=x2, the following proportion is true for the values x1 and x2:

$$\frac{-j * F1_\phi(x) - F1_{\phi qACT}}{-F1_{\phi PACT}} = \frac{F2_\phi(x) - F2_{\phi PACT}}{F2_{\phi qACT}} \quad \text{formula 119b}$$

The values F1$_{APACT}$, F1$_{AqACT}$, F2$_{APACT}$, and F2$_{AqACT}$ or F1$_{\phi PACT}$, F1$_{\phi qACT}$, F2$_{\phi PACT}$, and F2$_{\phi qACT}$ are measured. By determining the function values F1$_A$(x) and F2$_A$(x) or F1$\phi$(x) and F2$\phi$(x), by means of which the equation according to formula 119a or 119b is fulfilled, the values x=x1 and x=x2 can be determined. For example, for a first estimate value x0 for x1, the corresponding function values F1(x0) and F2(x0) are read from the graph (FIG. 10) or from a table. Then an iterative approximation to the correct value x1 is carried out. x2 is determined in a manner analogous to this.

The value of x for the target closer to the bore sight axis can also be approximated from the formulas 120p or 120q derived from the formulas 119a, 119b, by virtue of the fact that the value for each of F2$_A$(x) and F2$_\phi$(x) is set equal to F2$_A$(0) or F2$_\phi$(0).

$$F1_A(x) = \quad \text{formula 120p}$$

$$F1_{APACT} - F2_{APACT} * \frac{F1_{AqACT}}{F2_{AqACT}} + F2_A(x) * \frac{F1_{AqACT}}{F2_{AqACT}}$$

$$-j * F1_\phi(x) = \quad \text{formula 120q}$$

$$F1_{\phi qACT} + F2_{\phi PACT} * \frac{-F1_{\phi PACT}}{F2_{\phi qACT}} - F2_\phi(x) * \frac{-F1_{\phi PACT}}{F2_{\phi qACT}}$$

In the event that only a single object is disposed in the radar beam (single-target case), its position x in the first measurement dimension x (and analogously in a device with two measurement dimensions, in the second measurement dimension y) can be determined as follows:

$$F1_A(x) = F1_{APACT} = x = F1_A^{-1}(F1_{APACT}) \text{ or } x = F2_A^{-1}(F2_{APACT}) \quad \text{formula 121p}$$

$$-j*F1_\phi(x) = F1_{\phi qACT} = x = F1_\phi^{-1}(j*F1_{\phi qACT}) \text{ or } x = F2_\phi^{-1}(F2_{\phi PACT}) \quad \text{formula 121q}$$

In comparison to the classic monopulse process, the process according to the invention therefore permits the precise determination of target data in the single-target case as well since two equations are available for determining each of the target offset positions x, y.

Figure 4:
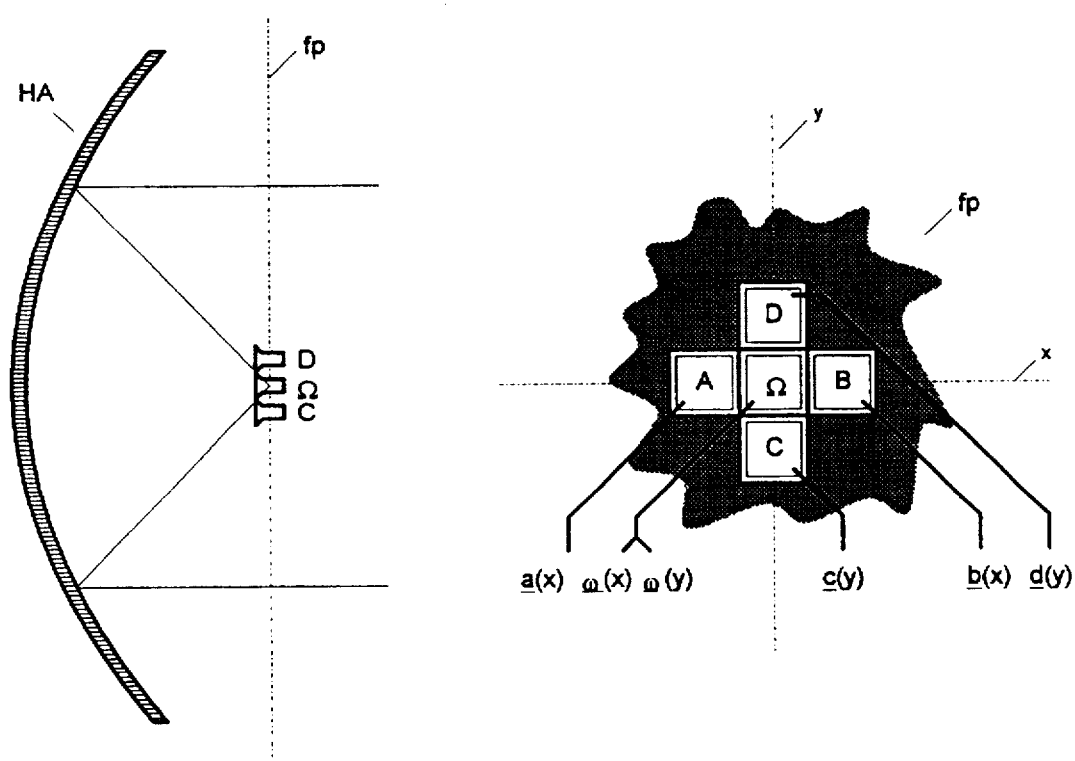
FIG. 4 shows the horn antenna according to FIG. 3 in connection with a parabolic reflector.
Figure 3:
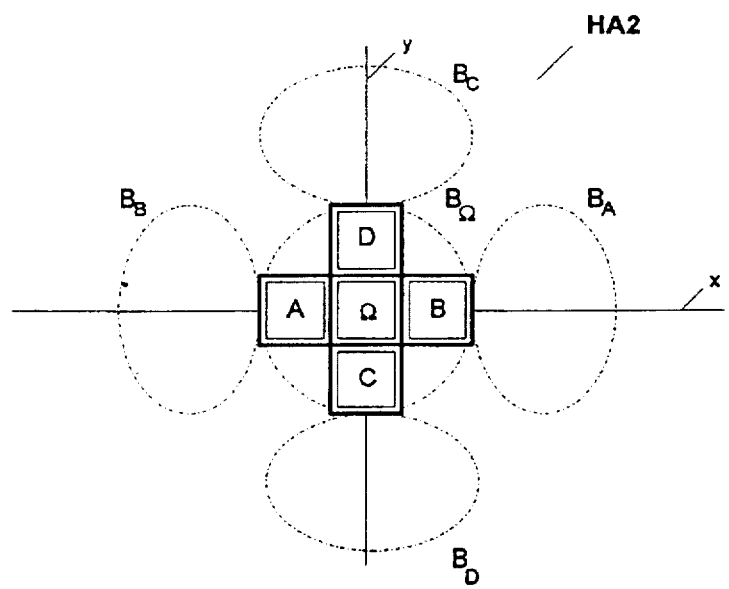
FIG. 3 shows a section through the beams of an amplitude monopulse antenna with five horns

As shown by way of example in FIGS. 3 and 4 (FIG. 4 shows a section through a parabolic antenna), two other subantennas C and D are required to determine the position of the flying objects TT1 and TT2 in another measurement dimension. The process according to the invention can also be carried out analogously for the second measurement axis (elevation) in conjunction with subantennas Ω, C, and D. The centrally disposed subantenna Ω can be used as a reference antenna for both measurement dimensions. The main radiation direction of subantenna Ω is disposed together with the main radiation directions of subantennas A and B in a first measurement plane and together with the axes of subantennas C and D in a second measurement plane preferably orthogonal to the first plane. By using the process according to the invention, therefore, the positions of two flying objects TT1 and TT2 can be precisely measured with regard to both elevation and azimuth.

Figure 5:
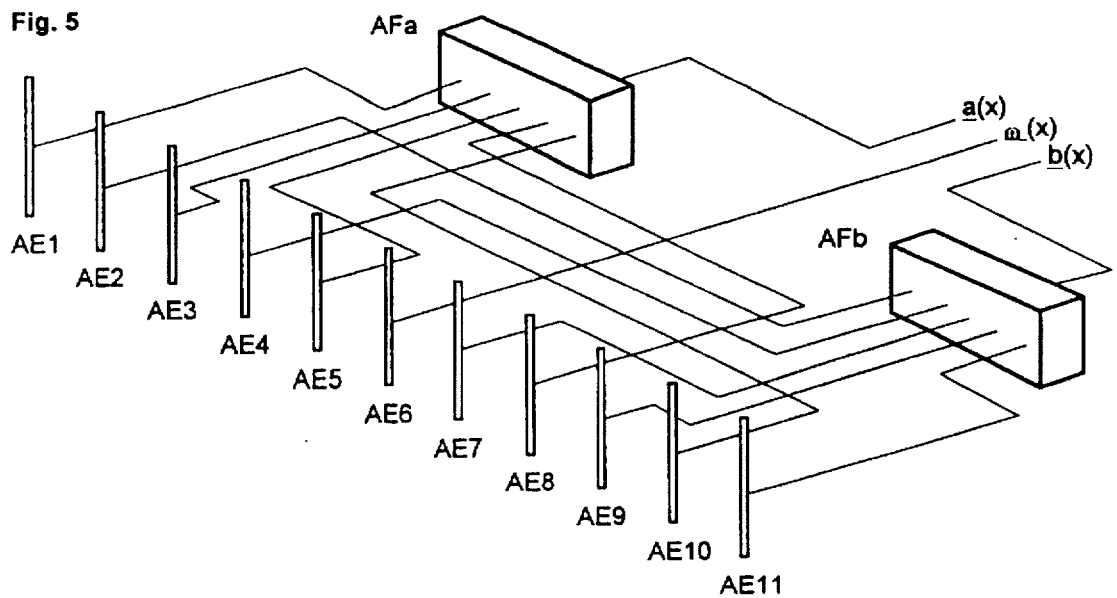
FIG. 5 shows an array antenna with three subantennas for the amplitude monopulse process
Figure 6:
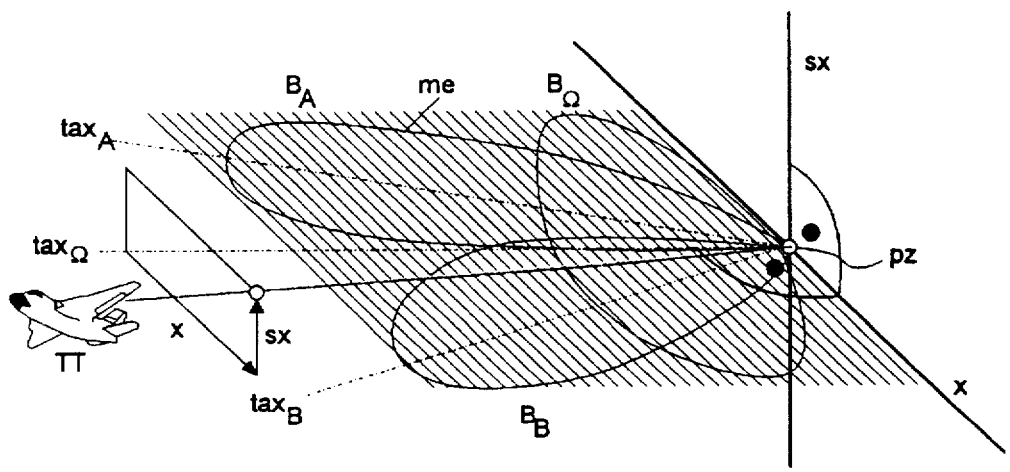
FIG. 6 shows the antenna beams of the antennas shown in FIGS. 2 and 5.

Furthermore, FIG. 5 shows that subantennas comprised of antenna elements AE1, ..., AEn can also be advantageously used for the amplitude monopulse process. The antenna elements AE1, ..., AEn have to be disposed in such a way and connected to existing networks AFa and AFb in such a way that the main radiation directions of the subantennas in turn are aligned as shown in FIG. 6. The network AFa transmits signal a(x), network AFb transmits signal b(x), and antenna element AE6 transmits signal ω(x). The weighting and combination of the antenna signals a(x), b(x), and ω(x) is carried out in a subsequent network.

Figure 9:
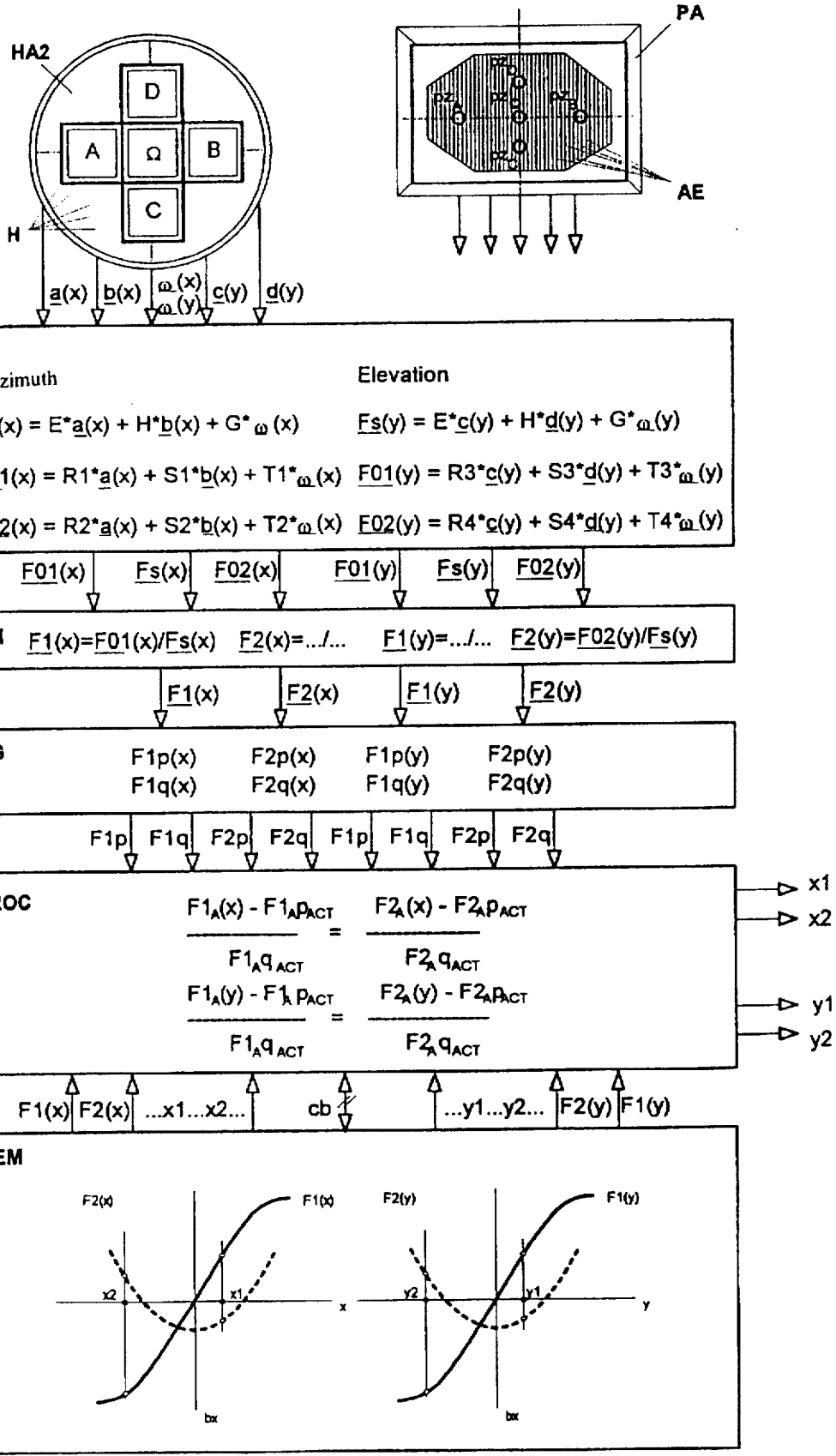
FIG. 9 shows a monopulse radar device according to the invention.

FIG. 9 shows a monopulse radar device that has either an antenna HA2 or an antenna PA, a network AF that is provided for addition and subtraction as well as for weighting the antenna signals a(x), b(x), ω(x), c(x), and d(x) a division step NM provided for division that normally also contains the reception channels, a quadrature demodulator QG provided for the production of quadrature components, and a processor PROC connected to a memory unit MEM. Networks AF and demodulators QG are known, for example, from E. Brookner, loc. cit., chapter 5.4.5, p. 316 (Comparators) and chapter 5.6.2, p. 322. The quotients according to formulas 16 and 17, which are independent of the incoming signal intensities, can be produced in the division step NM. In principle, the processes occurring in the steps AF, NM, QG can also be completed in the processor PROC. To that end, the signals transmitted by the subantennas A, B, Ω, C, D are supplied to the processor PROC in an amplified, demodulated, and digitized form. The processor PROC preferably functions in accordance with the pipeline process and therefore has a high input cycle. The reading of data, though, possibly occurs delayed by a few clock cycles. The stored functions F1, F2 are preferably approximated in a first step by polynomials of the third order and the equations are solved analytically. The solutions arrived a t in this manner are preferably used as first approximation values for an iterative process.

The radar device can be embodied as an extended amplitude monopulse radar device or as a phase monopulse radar device and is correspondingly provided with one of the antennas shown in FIGS. 2, 3, 5, or 7 (e.g. horn antenna HA2 or phased array antenna PA). In the network AF, the signals a(x), b(x), and ω(x) (or c(y), d(y), and ω(y)) transmitted by the subantennas A, B, Ω, C, D are individually weighted and added for the numerators and denominators in formulas 16 and 17 (or 101a, 101b). In the division step NM, the divisions of the signals are carried out according to formulas 16 and 17 (or 101a, 101b) so that at the start of this step, there are signals that correspond to the functions F12 and F22 and are split into in-phase components $F1p_{ACT}$, $F2p_{ACT}$ and quadrature components $F1q_{ACT}$, $F2q_{ACT}$ in the demodulator QG. The signals $F1p_{ACT}$, $F1q_{ACT}$, $F2p_{ACT}$, and $F2q_{ACT}$ determined in the radar device by means of these measures are scanned in accordance with the signal band width and supplied to the processor PROC, which, in accordance with formulas 119a and 119b, determines the solutions x1 and x2 of equations 119b by using the antenna functions F1(x), F2(x) that are stored in the memory MEM and measured for the single-target case. The offset angles x1 and xy determined in this manner, as well as y1 and y2, which must be determined analogously, give precise information about the position of both flying objects TT1, TT2 disposed in the radar beam.

According to formula 2, the following is true for the functions F1(x) and F2(x):

$$\underline{F1}(x) = \frac{R1 * \underline{a}(x) + S1 * \underline{\omega}(x) + T1 * \underline{b}(x)}{E * \underline{a}(x) + G * \underline{\omega}(x) + H * \underline{b}(x)} = \frac{FO1(x)}{Fs(x)}$$

$$\underline{F2}(x) = \frac{R2 * \underline{a}(x) + S2 * \underline{\omega}(x) + T2 * \underline{b}(x)}{E * \underline{a}(x) + G * \underline{\omega}(x) + H * \underline{b}(x)} = \frac{FO2(x)}{Fs(x)}$$

Written in matrix form, the following is correspondingly true:

$$\begin{pmatrix} Fs(x) \\ \underline{FO1}(x) \\ \underline{FO2}(x) \end{pmatrix} = \begin{pmatrix} E & G & H \\ R1 & S1 & T1 \\ R2 & S2 & T2 \end{pmatrix} * \begin{pmatrix} \underline{a}(x) \\ \underline{\omega}(x) \\ \underline{b}(x) \end{pmatrix} \qquad \text{formula 1000}$$

or $$\begin{pmatrix} \underline{a}(x) \\ \underline{\omega}(x) \\ \underline{b}(x) \end{pmatrix} = \begin{pmatrix} E & G & H \\ R1 & S1 & T1 \\ R2 & S2 & T2 \end{pmatrix} * \begin{pmatrix} Fs(x) \\ \underline{FO1}(x) \\ \underline{FO2}(x) \end{pmatrix}$$

In principle, therefore, as described in an introductory way, suitable functions F1(x), F2(x) are established and then the corresponding antenna beams are determined according to formula 1000. For array antennas in which signal components should be obtained from as many of the antenna elements as possible, it is, however, more meaningful to establish and optimize illumination functions JS, JO1, and JO2 and to determine functions F1(x) and F2(x) based on them. The transition from the illumination function Js; JO1 or JO2, by means of which the weighting of the elementary signals of an array antenna are established as a function of the location lx on the array, to the corresponding antenna function Fs(x), FO1(x), and F)2(x) is carried out by means of the Fourier transformation. The incoming wave-fronts from the measured objects, which wave-fronts are curved in the multi-target case, are scanned or measured by means of illumination functions Js(1x), JO1(lx), and JO2(lx). In the event that only one ball-shaped or approximately flat wave-front coming from a target were to be measured, its inclination with regard to the radar antenna could be determined with an illumination function in accordance with the classic monopulse process (inclination monopulse). In order to measure the curvature of a wave-front coming from two targets, an additional illumination function is required, which is linearly independent of the first one. The extension of the classic monopulse process by introducing an additional antenna function is described below as the curvature monopulse process. The illumination function JO2(lx) is optimized for a measurement of the field curvature. In contrast, for the two-dimensional sum illumination function, js(lx, ly) with js(lx, 0)=Js(lx); js(0, ly)=Js(ly).

Based on the results obtained at the beginning, the following requirements are set for the illumination functions JO1, JO2 of the curvature monopulse process:

requirement 1' in the single-target case, the normalized antenna functions F1(x), F2(x) should transmit signals that are perpendicular to the measurement plane or measurement axis, independent of the target offset position, requirement 2' the complex antenna functions F1(x), F2(x) defined for the single-target case should be either purely real or purely imaginary, requirement 3' both illumination functions JO1 (inclination) and JO2 (curvature) should be linearly independent of each other, requirement 4' a common reference illumination function Js or its antenna function Fs(x) is used to normalize the Fourier-transformed illumination functions JO1, JO2 or the antenna functions F1(x), F2(x) produced from them.

By fulfilling these requirements, which correspond to the requirements 1, 2, 3, and 4 mentioned at the beginning, antenna functions F1(x), F2(x) are produced, in conjunction with which the resolution of two targets with regard to position, signal power, and signal phase is successful. After determining the antenna functions F1(x), F2(x), the process according to the invention is carried out in the manner already described above.

To achieve the independence of the illumination functions JO1(lx) and JO2(lx), preferably the first is chosen as odd and the second is chosen as even. The course of the odd illumination function is centrically symmetrical with regard to the zero point of the coordinate system. The course of the even illumination function is axially symmetrical with regard to the ordinate of the coordinate system. By means of these measures, the linear independence of both illumination functions JO1(lx) and JO2(lx) and consequently also that of the antenna functions F1(x), F2(x) is achieved.

Furthermore, the extreme values of both two-dimensional illumination functions jO1(lx, lsx)=JO1(lx)*JO1s(lsx)) and jO2(lx, lsx)=JO2(lx)*JO2s(lsx)) (as well as the reference function js(lx, lsx)=Js(lx)*Jss(lsx))) are provided in the measurement plane. The courses of the illumination functions JO1s(lsx) JO2s(lsx) (as well as the reference function Jss(lsx)) with regard to target offset positions sx perpendicular to the measurement plane, must preferably be provided symmetrically to the measurement plane. The illumination function Js(lx), which turns into the sum function or reference function Fs(x) through the use of Fourier transformation, must be selected in such a way that the ratio FO1(x)/Fs(x) or FO2(x)/Fs(x) remains constant for offset positions perpendicular to the measurement axis, this can be achieved, for example, by virtue of the fact that together with the fulfillment of the above-mentioned requirements, the illumination functions JO1s(lsx), JO2s(lsx), and Jss(lsx) have function courses that are perpendicular to the measurement axis over the aperture of the array antenna, which function courses differ from one another only by means of a proportionality factor. The antenna functions produced from the two-dimensional illumination functions jO1(lx, lsx), jO2(lx, lsx) js(lx, lsx) by means of Fourier transformation are fO1(lx, lsx), fO2(lx, lsx) fs(lx, lsx).

In the event that the extreme values of an illumination function (e.g. JO2) are not disposed in the measurement plane, the corresponding function ratio FO2(x)/Fs(x) for offset positions perpendicular to the measurement plane cannot be kept constant.

In the classic monopulse process, only one odd antenna function (azimuth or elevation), which is normalized by means of a reference function, is provided for each measurement dimension and can supply constant values with regard to the target offset positions perpendicular to the measurement direction. In the normalization of the previously known diagonal difference function or the previously known cross term function using the same reference function, a function is produced that yields different values as a function of target offset positions perpendicular to the measurement direction. This is clearly one of the reasons for the above-cited view, that the diagonal difference signal has no practical value for the determination of the spatial angle of one or two targets.

Figure 11:
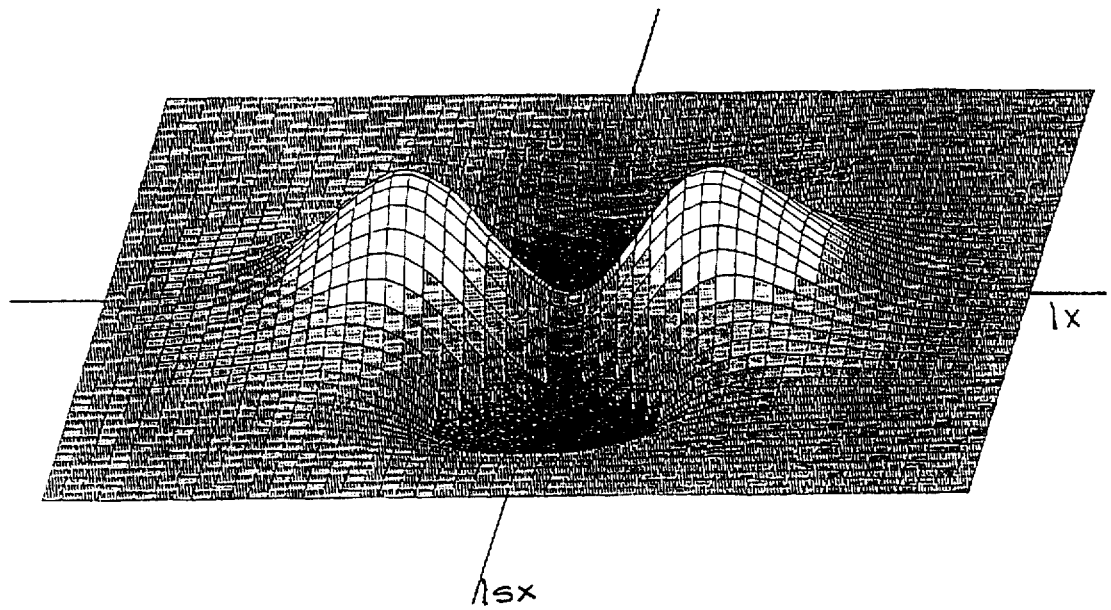
FIG. 11 shows the graph of the illumination function of the cross term signal (diagonal difference signal) with a horizontal measurement axis.
Figure 12:
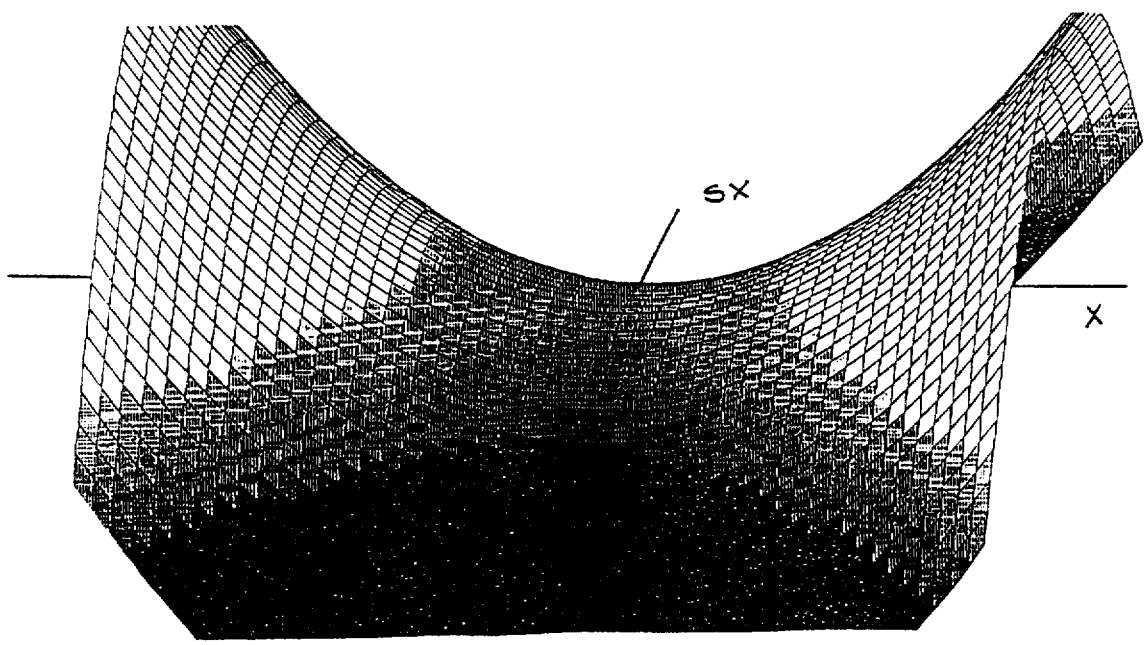
FIG. 12 shows the graph of the normalized cross term function whose function values are clearly not constant when there are target offset positions perpendicular to the measurement axis.
Figure 15:
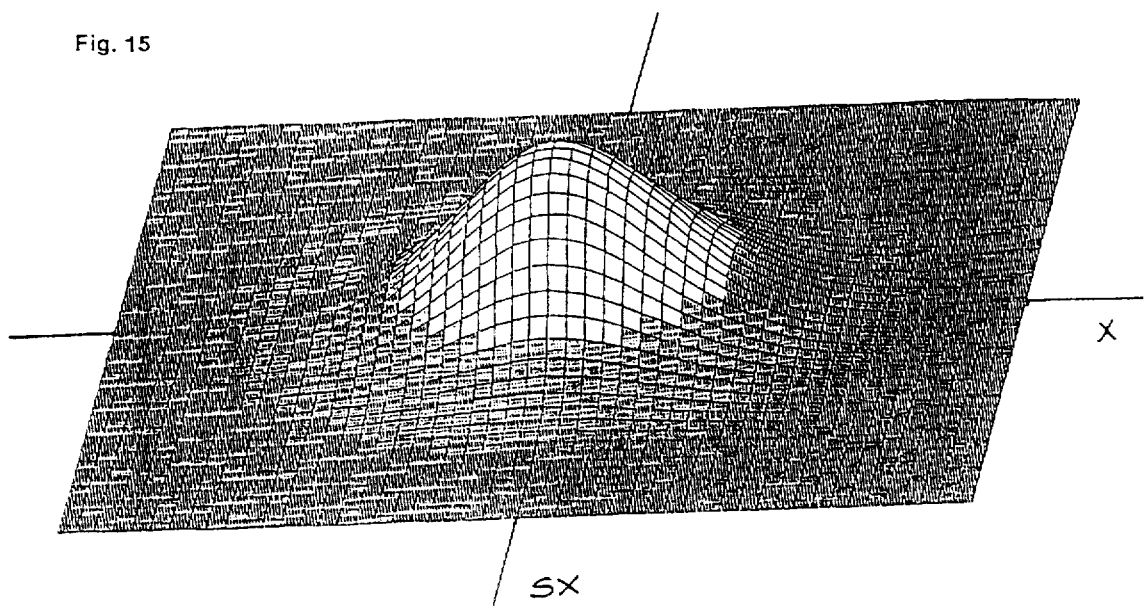
FIG. 15 shows the graph of the composite function provided for normalizing.

FIG. 11 shows the two-dimensional pattern of the antenna function of the cross term signal (diagonal difference signal), which pattern is known from S. M. Sherman, Monopulse Principles and Techniques, Artech House, Norwood, Mass., 1984, p. 341, FIGS. 12.2-1. After normalization with the sum function Fs shown in FIG. 15, the normalized cross term function is produced, whose two-dimensional pattern is shown in FIG. 12. It can be seen clearly from this that the values of this cross term function change as a function of target offset positions x in the measurement plane and as a function of target offset positions sx perpendicular to the measurement plane. The cross term function known from the prior art therefore does not fulfill requirement 3' according to the invention.

Figure 13:
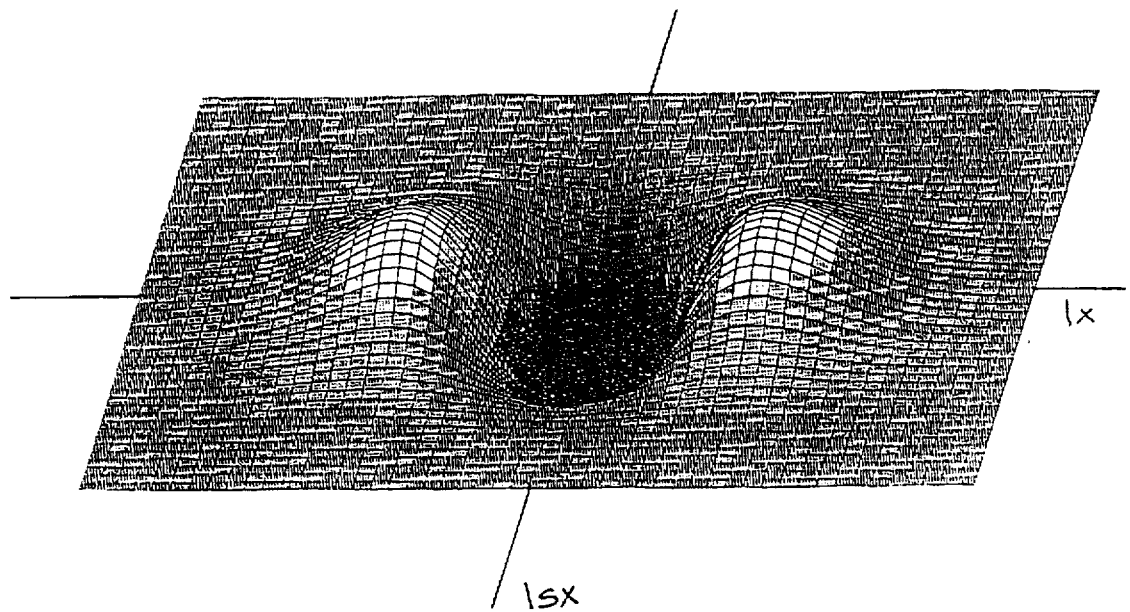
FIG. 13 shows the graph of the illumination function JO2 of the function FO2 determined according to the invention (measurement axis horizontal).
Figure 14:
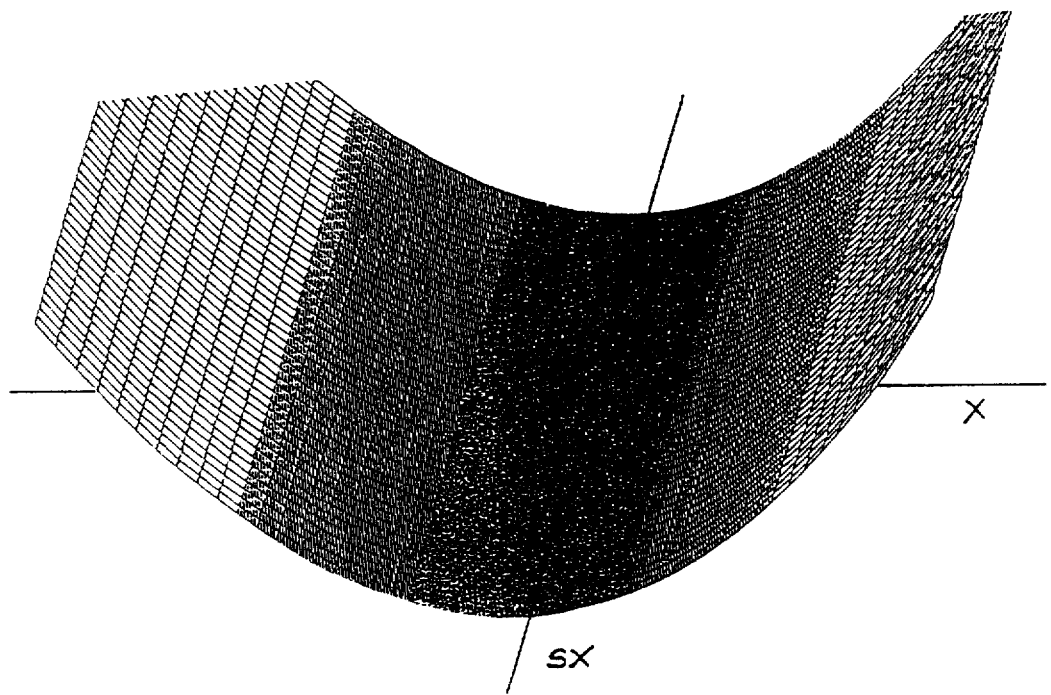
FIG. 14 shows the graph of the normalized function according to FIG. 13, whose function values are clearly constant when there are target offset positions perpendicular to the measurement axis.

FIG. 13 shows the two-dimensional pattern of an illumination function that is determined according to the invention and is for a function that can be used according to the invention (e.g. for FIG. 10, function F2(x)). After the Fourier transformation of this illumination function and the subsequent normalization with the sum function Fs shown in FIG. 15, the normalized function f2(x, sx) is produced from this, whose two-dimensional pattern is shown in FIG. 14. It can be seen clearly from this that the values of this function f2(x, sx) change as a function of target offset positions x in the measurement plane. Changes of the target offset position sx remain perpendicular to the measurement plane without influencing the values of function f2(x, sx), which therefore, only as a function of argument x, reads: f2(x, sx)→F2(x). The function F2(x) determined according to the invention fulfills requirement 1' according to the invention.

The optimization of the illumination functions for the composite signal and difference signal are known from the prior art. An even, quadratic weighting function W2(lx), whose average value over the antenna aperture is zero, is provided as an evaluation criterion for the efficiency of the even illumination function provided for measuring the field curvature:

$$W2(lx) = \left(\frac{lx}{lxo}\right)^2 - \frac{1}{3}, \text{ where } \int_{-lxo}^{lxo} W2(lx)dlx = 0.$$

lx is the location on the antenna measured from the center and lxo is the distance from the edge to the center of the antenna. The function W2 is ideal for measuring the curvature of a field. However, it has thick side lobes, which cannot be tolerated. The illuminating function JO2 should therefore be approximated to the function W2 until the side lobes achieve a tolerable dimension. Now, let:

$$PO2 = \int_{-lxo}^{lxo} JO2\,(lx)^2 dlx \quad \text{the reference power of the curvature beam and}$$

-continued $$PO2m = \left(\int_{-lxo}^{lxo} JO2(lx) * W2(lx)dlx\right)^2 \quad \text{the measurement power.}$$

Figure 18:
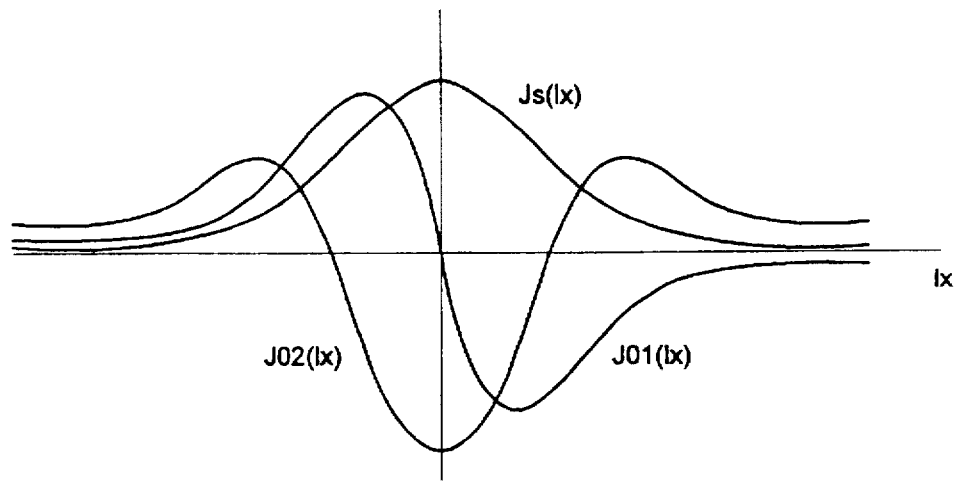
FIG. 18 shows the course of preferred illumination functions.

The curvature illumination function must now be chosen so that JO2(lx)=JO2(-lx). Furthermore, taking into account the permissible side lobes, PO2 should be maximal, by means of which a positive coupling of the antenna elements is produced. Furthermore, QO2=PO2m/PO2 should be maximal. QO2 is a measure for the efficiency of the antenna beam FO2 or the illumination function JO2, to measure the curvature of the field. Preferably in the measurement dimension, the illumination function JO2(lx) at least approximately has the following course shown in FIG. 18:

$$JO2(lx) = Const * (lx^2 - lxo^2) * e^{\frac{lx^2}{2*lxo^2}};$$

This function is produced according to the double derivation of a Gauss function assumed for Js(lx). lxO is the location on the aperture where the excitation amplitude of the Gauss function has reduced by $1/e^{1/2}$ or the excitation power is reduced by 1/e in relation to the value in the center.

The process according to the invention can be used in a particularly advantageous manner in connection with radar devices that are suited for carrying out the side lobe suppression (SLS) process, which is described for example in Richard C. Johnson, Antenna Engineering Handbook, McGraw Hill Book Company, New York, 1993, third edition, chapter 33, pp. 33-6 to 33-8. In addition to a difference and sum pattern (difference and Σ pattern), a notch pattern is used, which is produced from the sum pattern by means of the phase inversion of the elementary signals from antenna elements which form a column perpendicular to the measurement axis, in the center of the array antenna. This notch pattern has a similarity to the pattern of the illumination function JO2 (lx) determined according to the invention and shown in FIG. 13. After Fourier transformation and normalization using the sum function, the illumination function of the SLS array antenna, which function corresponds with the notch pattern, corresponds to an even function F2(x) that can be employed according to the invention. A radar system that is suited for carrying out the side lobe suppression (SLS) process can therefore be extended into a system suited for carrying out the process according to the invention, practically without hardware changes to the antenna. The two processes provided in a radar system for suppressing target signals that are received via side lobes as well as for resolving two targets that are detected by the main lobes therefore supplement each other in an ideal manner.

The target directions ascertained in accordance with the process according to the invention can also be used for controlling the antenna. With the preferable use of an antenna that can be electronically controlled, the transmission pattern is adjusted in such a way that if possible, no signal is transmitted or received with regard to the direction of an interference signal or a target to be blanked out.

The data for determining the target offset positions x1, x2 (or if provided, y1, y2) present in the processor can furthermore be used for determining the phase angle φ between the signals arriving from direction x1, y1 and x2, y2. For the values of the difference channel of the amplitude monopulse process, the following are true (indexes A and ACT are not written, e.g. F1$_A$q$_{ACT}$→F1q, F1$_A$p$_{ACT}$→F1p; F1$_A$(x)→F1(x)):

$$\sin\phi = \frac{-F1q * (F1(x1) - F1(x2))}{\sqrt{F1q^2 + F1(x2)^2 - 2F1(x2) * F1p + F1p^2} * \sqrt{F1q^2 + F1(x1)^2 - 2F1(x1) * F1p + F1p^2}}$$

$$\cos\phi = \frac{-(F1(x1) * F1(x2) - F1(x1) * F1p - F1(x2) * F1p + F1p^2 + F1q^2)}{\sqrt{F1q^2 + F1(x1)^2 - 2F1(x1) * F1p + F1p^2} * \sqrt{F1q^2 + F1(x2)^2 - 2F1(x2) * F1p + F1p^2}}$$

The angle $\phi$ can be definitely determined in conjunction with the values of $\sin\phi$ and $\cos\phi$. Likewise, the angle $\phi$ can also be determined with the data of the curvature channel (replace F1 with F2 in the above formulas) and can be determined with the data used in the phase monopulse process. Actual double-target cases and reflection cases can be distinguished from each other by measuring the angle $\phi$ and unfavorable phase positions can be detected in which the angle $\phi$ approaches zero or $\pi$. Phase differences $\phi$ close to zero or close to $\pi$ can be prevented for example by changing the transmission frequency. In the event of reflections, the phase changes between two measurements are typically smaller by a factor of approximately a hundred than in double-target cases, in which the transponders of two targets have different transmission frequencies. As a result, reflections can be distinguished from actual double-target cases. Two targets can furthermore be each associated with a difference frequency (beat vibration) which permits it to identify this target pair again at a later time.

Furthermore, the proportions L1, L2 of the powers of the signals from two targets from the directions x1, y1 and x2, y2 can be determined in proportion to the power of the composite signal. This is identified below for the amplitude monopulse process (with index A):

$$L_A1 = \frac{F1_A q^2_{ACT} + F1_A(x2)^2 - 2 * F1_A(x2) * F1_{APACT} + F1_A P^2_{ACT}}{F1_A(x2)^2 - 2 * F1_A(x1) * F1_A(x2) + F1_A(x1)^2} ;$$

$$L_A2 = \frac{F1_A q^2_{ACT} + F1_A(x1)^2 - 2 * F1_A(x1) * F1_{APACT} + F1_A P^2_{ACT}}{F1_A(x2)^2 - 2 * F1_A(x1) * F1_A(x2) + F1_A(x1)^2} ;$$

Likewise, the power ratios $L_A1$, $L_A2$ can also be determined with the data of the curvature channel as well as with the data used in the phase monopulse process. As a result of the data obtained, the targets can be marked and tracked more easily afterwards. In the event that two targets are detected by the radar system according to the invention (see FIG. 9), their angular data x1, y1 and x2, y2 can be determined according to the invention. In the event that the targets switch positions in a later moment, this is not detected if only the angular data x1, y1 and x2, y2 are determined. However, if the power ratios $L_A1$, $L_A2$ have been determined before the switch, the targets can also be definitely identified once more after a transmission interruption.

If the effective powers, which are independent of the antenna and specific to the target are intended to be determined from a power measurement of the composite signal and from the particular power ratios L1 and L2, the directional characteristic curve of the composite pattern in the direction of the relevant target must be taken into consideration as a correction factor in comparison with the calibration direction.

The determination of the power ratios $L_A1$, $L_A2$ and the target specific powers can be used in an extremely advantageous manner for various purposes. For one thing, the targets can be labelled as described above, by means of which the tracking of these targets is perceptibly simplified. Furthermore, it can be determined whether this is a single-target or a double-target case. If a threshold value close to zero or $\infty$ is respectively fallen below or exceeded, then the process for determining the target data in accordance with the formulas (formula 121) for the single-target case is used. The determination of the power ratios $L_A1$, $L_A2$ is furthermore advantageous in target measurement in two dimensions. By means of the process according to the invention, as explained above, target offset positions x1, x2, y1, and y2 can be determined. It is unclear for the moment which target offset positions are to be combined with one another. Is the first target disposed at point x1, y2 and the second target disposed at point x2, y1, or is the first target disposed at point x1, y1 and the second target disposed at point x2, y2? By means of power measurement, it can now be determined which pair of target offset positions x1, y1; x1, y2 or x2, y1; x2, y2 has at least approximately the same power ratios $L_A1$ or $L_A2$ and is associated with a target pair and not a phantom pair. The determination of the power ratios $L_A1$, $L_A2$ for the suppression or separation of interference signals (defruiting, degarbling) is of particular significance. The underlying individual signals can therefore be identified.

Figure 17:
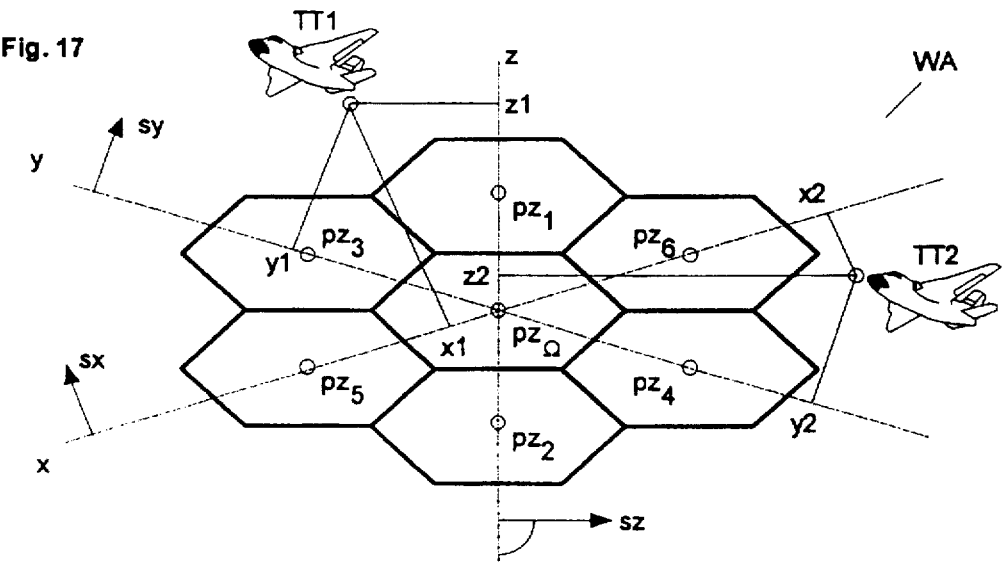
FIG. 17 shows a honeycomb antenna with measurement axes that are not perpendicular to each other.

Furthermore, the honeycomb antenna WA shown in FIG. 17 provided with seven subarrays can be advantageously used, which permits the measurement of two targets in three coplanar measurement dimensions x, y, z and the definite location of them in conjunction with the measurement values x1, x2, y1, y2, z1, z2. The three measurement axes x, y, z run through the phase centers pz5, pzΩ, pz6; pz3, pzΩ, pz4, or pz1, pzΩ, pz2 of each of three subarrays and preferably intersect in the phase center pzΩ of the central subarray Ω. Phantom or ghost images can be completely eliminated through the use of measurement values from the third measurement dimension, without taking into account the powers of the individual signals. This brings about the advantage that the definite location is also possible when the power ratios of both target echo signals are the same. The targets TT1, TT2 shown in FIG. 17 are disposed at points that are labeled by measurement values from all three measurement dimensions.

For precise target measurement, particularly with the reception of incoherent targets (e.g. in IFF reception of two transponder signals with frequencies that deviate slightly from each other), it is important that the input signals $F1p_{ACT}$, $F1q_{ACT}$, $F2p_{ACT}$, $F2q_{ACT}$ are scanned at the same time.

Naturally, the measurement of target data in accordance with the process according to the invention can be carried out only with regard to position x1, y1; x2, y2, only with regard to phase $\phi$, or only with regard to the power ratios $L_A1$, $L_A2$, but can also be carried out in arbitrary combinations.

I claim:

1. A process for an amplitude or phase monopulse radar device for position measurement of a first target (TT1) and if need be, a second target (TT2) detected by the radar beam from the directions x1, y1; x2, y2, whose echo signals overlap, having a horn or array antenna (HA; PA), which, for one measurement axis x, has at least three subantennas (A, B, Ω) that are embodied and disposed in such a way that with their output signals, two linear combinations FO1(x) and FO2(x) can be formed, by means of which, after normalization with a third linear combination Fs(x) of output signals, two antenna functions $F1(x)=FO1(x)/Fs(x)=F1p(x)+jF1q(x)$, with $F1p(x)$ or $F1q(x)=0$ $F2(x)=FO2(x)/Fs(x)=F2p(x)+jF2q(x)$, with $F2p(x)$ or $F2q(x)=0$ are formed, which are linearly independent of each other, purely real or purely imaginary, and independent of target offset positions perpendicular to the measurement axis, that these antenna functions F1(x) and F2(x) are measured for the single-target case and the function values that are dependent upon the target offset position x are stored, that measurement values $F1_{ACT}=F1p_{ACT}+F1q_{ACT}$, in the two-target case with $F1p_{ACT}$ and $F1q_{ACT}\neq 0$, $F2_{ACT}=F2p_{ACT}+F2q_{ACT}$, in the two-target case with $F2p_{ACT}$ and $F2q_{ACT}\neq 0$ are determined according to the antenna functions F1(x) and F2(x) for the targets (TT1, TT2) detected by the radar beam, and the equation given below for the amplitude monopulse process (index A) or the phase monopulse process (index φ) is solved for the target directions x1 and x2 by using the stored function values:

$$\frac{F1_A(x) - F1_{APACT}}{F1_{AqACT}} = \frac{F2_A(x) - F2_{APACT}}{F2_{AqACT}}$$

$$\frac{-j * F1_\phi(x) - F1_{\phi qACT}}{-F1_{\phi pACT}} = \frac{F2_\phi(x) - F2_{\phi pACT}}{F2_{\phi qACT}}.$$

2. A process according to claim 1, characterized in that one of the functions F1(x), F2(x) is even and the other is odd and/or that the main radiation directions of the three subantennas (A, B, Ω) or the extreme values of all illumination functions jO1(lx, lsx), jO2(lx, lsx), js(lx, lsx) are disposed in one plane and/or that the radiated field patterns of the three subantennas (A, B, Ω) or the illumination functions jO1(lx, lsx), jO2(lx, lsx), js(lx, lsx) have a straight symmetry course with regard to offset positions perpendicular to the measurement axis and/or that the functions f1(x, sx), f2(x, sx), fs(x, sx) have function courses perpendicular to the measurement axis, which differ from one another only by means of a proportionality factor.

3. The process according to claim 1, carried out with a horn antenna or an array antenna (HA; PA), which has a first group of three subantennas or a first group of three illumination functions JO1(lx), JO2(lx), Js(lx) for the first measurement axis x (e.g. azimuth) and has a second group of three subantennas (Ω, C, D) or a second group of three illumination functions JO1(ly), JO2(ly), Js(ly) for a second measurement axis y (e.g. elevation), and that preferably, one subantenna (Ω) or one illumination function js(lx, ly) with js(lx,O)=Js(lx); js(O, ly)=Js(ly) is common to both groups.

4. The process according to claim 1, characterized in that the target offset positions (x1, x2 or y1, y2) are approximately calculated by the function F2(x) or F2(y) being replaced by F2(O).

5. The process according to claim 1, characterized in that the course of the even illumination functions JO2(x) or JO2(y) provided for the curvature measurement corresponds at least approximately to the course of the function:

$$JO2(lx) = Const * (lx^2 - lxO^2) * e^{\frac{lx^2}{2*lxO^2}}$$

or $$JO2(ly) = Const * (ly^2 - lyO^2) * e^{\frac{ly^2}{2*lyO^2}}$$

and/or that the illumination function JO2(lx) provided for measuring the field curvature corresponds to the second derivation of the illumination function Js(lx) provided for measuring the field intensity, and/or that the established course of the illumination function JO2(x) or JO2(y) is approximated to the course of the function $$W2(lx) = \left(\frac{lx}{lxo}\right)^2 - \frac{1}{3} \text{ or } W2(ly) = \left(\frac{ly}{lyo}\right)^2 - \frac{1}{3}$$

until the side lobes reach the permissible dimension.

6. The process according to claim 1, characterized in that the ratio of the antenna functions FO2(x)/Fs(x) in the single-target case is at least approximately proportional to the square of the angular offset position and/or is equal to zero on the bore sight axis (no angular offset).

7. The process according to claim 1, characterized in that the control, SLS, or omnidirectional beam function of a corresponding antenna system is used as the antenna function FO2(x).

8. The process according to claim 1, characterized in that the signals $F1_{ACT}$, $F2_{ACT}$ produced in the input steps (AF, NM) of the radar device are divided into in-phase components $F1p_{ACT}$, $F2p_{ACT}$ and quadrature components $F1q_{ACT}$, $F2q_{ACT}$ in another step (QG) and are scanned at the same time.

9. The process in particular according to claim 1, characterized in that the phase difference φ between signals coming in from two directions is measured and it is determined whether an actual double-target case or a reflection case is detected and/or whether phase positions that are unfavorable for the measurement are detected, in which the angle φ approaches zero or π and which can be prevented for example by changing the transmission frequency.

10. The process in particular according to claim 1, characterized in that the ratios L1, L2 of the powers of the signals from two targets from the directions x1, y1 and x2, y2 are determined in proportion to the power of the composite signal, that in the reflection case, the reflection factor is determined in conjunction with the ascertained power ratios L1, L2 and/or that in the event that the quotient L1/L2 produced by means of the power ratios L1, L2 lies sufficiently close to zero or ∞, the calculation of the target data is carried out for the single-target case and/or that the localized targets are labeled with the associated power ratios L1, L2, which are checked with each measurement interval when tracking a target so that the appropriate target can be distinguished from other targets or interference sources and/or that with target measurement in two dimensions, the power ratios $L_A1$, $L_A2$ are associated with the target offset positions x1, x2, y1, and y2 and then it is determined which pair of target offset positions x1, y1; x1, y2 or x2, y1; x2, y2 belongs to the first target and which belongs to the second target.

11. The process according to claim 1, characterized in that an antenna is used that can be electronically controlled, whose transmission pattern is preferably set in such a way that if possible, no signal is transmitted or received with regard to the direction of an interference signal or a target to be blanked out.

12. The process according to claim 1, characterized in that the signals of the subantennas (A, B, Ω, or Ω, C, D) provided for each measurement direction are preferably weighted by the factors R, S, T; E, G, and H in a weighting network provided in the antenna unit, the weighting being carried out in such a way that an odd inclination function FO1(x); FO1(y), an even curvature function FO2(x); FO2(y), and a sum function Fs(x); Fs(y) is produced for each measurement direction x; y.

13. The process according to claim 1, characterized in that illumination functions jO1(lx, lsx); jO1(ly, lsy), jO2(lx, lsx); jO2(ly, lsy), js(lx, lsx) js(ly, lsy) and/or antenna functions fO1(x, sx); fO1(y, sy), fO2(x, sx); fO2(y, sy), fs(x, sx) fs(y, sy) are selected, which can be represented as the product of a component JO1(lx); JO1(ly), JO2(lx); JO2(ly), Js(lx) Js(ly) or FO1(x); FO1(y), FO2(x); FO2(y), Fs(x) Fs(y) in the measurement direction x, y and a component JO1(lsx); JO1(lsy), JO2(lsx); JO2(lsy), Js(lsx) Js(lsy) in the direction of the perpendiculars lsx, lsy to lx, ly and the perpendiculars sx, sy to the measurement direction x, y.

14. The process according to claim 1, characterized in that the determination of target data is carried out based on the amplitude and/or phase monopulse process.

15. The process according to claim 1, characterized in that for the determination of target data in the single-target case, at least one of the equations below is used:

for the amplitude monopulse process, $x=F1_A^{-1}(F1_A p_{ACT})$ and/or $x=F2_A^{-1}(F2_A p_{ACT})$ and for the phase monopulse process, $x=F1_\phi^{-1}(j*F1_\phi q_{ACT})$ and/or $x=F2_\phi^{-1}(F2_\phi p_{ACT})$.

16. The process according to claim 1, characterized in that the measurement is preferably carried out using a honey-comb antenna with seven subarrays for three measurement dimensions x, y, and z disposed in one plane, and it is determined which target directions can be correspondingly determined based on measurements in the three measurement directions x, y, and z.

17. A process for a monopulse radar device for position measurement of a first target (TT1) and if need be, a second target (TT2) detected by the radar beam from the directions x1, y1; x2, y2, whose echo signals overlap, having an antenna whose signals are produced by three illumination functions transformed into antenna functions FO1(x), FO2(x), Fs(x), of which the first JO1(lx) is provided for measuring the field inclination, the second JO2(lx) is provided for measuring the field curvature, and the third Js(lx) is provided for measuring the field intensity, which illumination functions are selected in such a way that after normalization of the antenna functions FO1(x), FO2(x) with the antenna function Fs(x), two antenna functions $F1(x)=FO1(x)/Fs(x)=F1p(x)+jF1q(x)$, with $F1p(x)$ or $F1q(x)=0$ $F2(x)=FO2(x)/Fs(x)=F2p(x)+jF2q(x)$, with $F2p(x)$ or $F2q(x)=0$ are formed that are linearly independent of each other, purely real or purely imaginary, and independent of target offset positions perpendicular to the measurement axis, that these antenna functions F1(x) and F2(x) are measured for the single-target case and the function values that are dependent upon the target offset position x are stored, that measurement values $F1_{ACT}=F1p_{ACT}+F1q_{ACT}$, in the two-target case with $F1p_{ACT}$ and $F1q_{ACT}\neq 0$, $F2_{ACT}=F2p_{ACT}+F2q_{ACT}$, in the two-target case with $F2p_{ACT}$ and $F2q_{ACT}\neq 0$ are determined according to the antenna functions F1(x) and F2(x) for the targets (TT1, TT2) detected by the radar beam, and the equation given below for the amplitude monopulse process (index A) or the phase monopulse process (index φ) is solved for the target directions x1 and x2 by using the stored function values:

$$\frac{F1_A(x)-F1_{Ap_{ACT}}}{F1_{Aq_{ACT}}} = \frac{F2_A(x)-F2_{Ap_{ACT}}}{F2_{Aq_{ACT}}}$$

-continued $$\frac{-j*F1_\phi(x)-F1_{\phi q_{ACT}}}{-F1_{\phi p_{ACT}}} = \frac{F2_\phi(x)-F2_{\phi p_{ACT}}}{F2_{\phi q_{ACT}}}.$$

18. An amplitude or phase monopulse radar device for position measurement of a first target (TT1) and if need be, a second target (TT2) detected by the radar beam from the directions x1, y1; x2, y2, whose echo signals overlap, having a horn antenna or an array antenna (HA; PA), which, for a first measurement axis x, has at least three subantennas (A, B, Ω) that are embodied and disposed in such a way that with their output signals, two linear combinations FO1(x) and FO2(x) can be formed, by means of which, after normalization with a third linear combination Fs(x) of output signals, two antenna functions $F1(x)=FO1(x)/Fs(x)=F1p(x)+jF1q(x)$, with $F1p(x)$ or $F1q(x)=0$ $F2(x)=FO2(x)/Fs(x)=F2p(x)+jF2q(x)$, with $F2p(x)$ or $F2q(x)=0$ are formed, which are linearly independent of each other, purely real or purely imaginary, and independent of target offset positions perpendicular to the measurement axis, that a memory unit (MEM) is provided in which the function values of the antenna functions F1(x) and F2(x) measured for the single-target case are stored, that measurement values $F1_{ACT}=F1p_{ACT}+F1q_{ACT}$, in the two-target case with $F1p_{ACT}$ and $F1q_{ACT}\neq 0$, $F2_{ACT}=F2p_{ACT}+F2q_{ACT}$, in the two-target case with $F2p_{ACT}$ and $F2q_{ACT}\neq 0$, can be determined for the targets (TT1, TT2) detected by the radar beam, in accordance with antenna functions F1 and F2, and that a processor (PROC) is provided to take the equation given below for the amplitude monopulse process (index A) or the phase monopulse process (index φ) and solve it for x1 and x2:

$$\frac{F1_A(x)-F1_{Ap_{ACT}}}{F1_{Aq_{ACT}}} = \frac{F2_A(x)-F2_{Ap_{ACT}}}{F2_{Aq_{ACT}}}$$

$$\frac{-j*F1_\phi(x)-F1_{\phi q_{ACT}}}{-F1_{\phi p_{ACT}}} = \frac{F2_\phi(x)-F2_{\phi p_{ACT}}}{F2_{\phi q_{ACT}}}.$$

19. The monopulse radar device according to claim 18, characterized in that one of the functions F1(x), F2(x) is even and the other is odd and/or that the main radiation directions of the three antennas (A, B, Ω) or the extreme values of all illumination functions jO1(lx, lsx), jO2(lx, lsx), js(lx, lsx) are disposed in one plane and/or that the radiated field patterns of the three subantennas (A, B, Ω) or the illumination functions jO1(lx, lsx), jO2(lx, lsx), js(lx, lsx) have a straight symmetry course with regard to offset positions perpendicular to the measurement axis and/or that the functions f1(x, sx), f2(x, sx), fs(x, sx) have function courses perpendicular to the measurement axis, which differ from one another only by means of a proportionality factor.

20. The monopulse radar device according to claim 18, characterized in that a horn antenna or an array antenna (HA; PA) is provided, which has a first group of three subantennas or a first group of three illumination functions JO1(lx), JO2(lx), Js(lx) for the first measurement axis x (e.g. azimuth) and has a second group of three subantennas (Ω, C, D) or a second group of three illumination functions JO1(ly), JO2(ly), Js(ly) for a second measurement axis y (e.g. elevation), and that preferably, a subantenna (Ω) or an illumination function js(lx, ly) with js(lx,O)=Js(lx); js(O, ly)=Js(ly) is common to both groups.

21. The monopulse radar device according to claim 18, characterized in that the antenna has a control, SLS, or omnidirectional beam function, which is used as a curvature function FO2(x) or FO2(y).

22. The monopulse radar device according to claim 18, characterized in that the phase difference φ between signals coming from two directions and/or the ratios L1, L2 of the powers of the signals from two targets from the directions x1, y1 and x2, y2 can be measured and evaluated in proportion to the power of the composite signal.

23. The monopulse radar device according to claim 18, characterized in that the antenna (PA) can be electronically controlled in such a way and its transmission pattern can be set in such a way that if possible, no signal is transmitted or received with regard to the direction of an interference signal or a target to be blanked out.

24. The monopulse radar device according to claim 18, characterized in that a network (AF) and a division step (NM) are provided, which produce the signals $F1_{ACT}$, $F2_{ACT}$ from the output signals of the subantennas (A, B, Ω or Ω, C, D), and that are divided into in-phase components $F1p_{ACT}$, $F2p_{ACT}$ and quadrature components $F1q_{ACT}$, $F2q_{ACT}$ in another step (QG).

25. The monopulse radar device according to claim 18, characterized in that for each measurement axis x; y, the amplitude monopulse antenna has three subantennas (A, B, Ω or Ω, C, D), which each have a common phase center and whose radiation axes for each measurement axis are disposed in one plane, or that for each measurement axis x; y, the phase monopulse antenna has three subantennas (A, B, Ω or Ω, C, D), whose phase centers for each measurement axis are disposed on a common line and whose radiation axes run parallel to one another.

26. The monopulse radar device according to claim 18, characterized in that the amplitude monopulse antenna or the phase monopulse antenna is an array antenna with a number of antenna elements (AE), which are provided singly or combined in groups to constitute subantennas (A, B, Ω or Ω, C, D).

27. The monopulse radar device according to claim 18, characterized in that the phase centers of the subantennas (A, B, and Ω or Ω, C, and D) are disposed in such a way that the phase center of subantenna (Ω) is enclosed with equal spacing between the phase centers of subantennas (A and B and/or C and D) and/or that the radiation axes of subantennas (A and Ω or C and Ω) enclose the same angle as the axes of subantennas (Ω and B or Ω and D) and/or that the patterns of subantennas (A and B or C and D) have an at least approximately equal amplitude course and/or that the patterns of subantennas (A and B or C and D) have a straight symmetry to the bore sight axis and that the pattern of subantenna (Ω) contains the bore sight axis bx of the extended monopulse antenna (HA, PA) as the axis for a straight symmetry.

28. The monopulse radar device according to claim 18 for measuring targets in three angular dimensions, characterized in that the antenna (WA) has the shape of a honeycomb with preferably seven subarrays through whose phase centers pz5, pzΩ, pz6; pz3, pzΩ, pz4, or pz1, pzΩ, pz2 three measurement axes x, y, z run, which intersect in the phase center pzΩ of the central subarray.

29. The monopulse radar device according to claim 18, characterized in that a processor (PROC) is provided, which operates in accordance with the pipeline process and/or which approximates the stored functions F1, F2 in a first step by means of polynomials of the third order and analytically solves the equations and/or which uses the solutions arrived at in this manner, preferably as the first approximation for an iterative process.

30. An amplitude or phase monopulse radar device for position measurement of a first target (TT1) and if need be, a second target (TT2) detected by the radar beam from the directions x1, y1; x2, y2, whose echo signals overlap, having an antenna whose signals are produced by three illumination functions transformed into antenna functions FO1(x), FO2(x), Fs(x), of which the first JO1(lx) is provided for measuring the field inclination, the second JO2(lx) is provided for measuring the field curvature, and the third Js(lx) is provided for measuring the field intensity, that after normalization of the antenna functions FO1(x), FO2(x) with the antenna function Fs(x), two antenna functions are formed that are linearly independent of each other, purely real or purely imaginary and independent of target offset positions perpendicular to the measurement axis $$F1(x)=FO1(x)/Fs(x)=F1p(x)+jF1q(x), \text{ with } F1p(x) \text{ or } F1q(x)=0,$$

$$F2(x)=FO2(x)/Fs(x)=F2p(x)+jF2q(x), \text{ with } F2p(x) \text{ or } F2q(x)=0$$

are formed that are linearly independent of each other, purely real or purely imaginary and independent of target offset positions perpendicular to the measurement axis, that a memory unit (MEM) is provided in which the function values of the antenna functions F1(x) and F2(x) measured for the single-target case are stored, that measurement values $$F1_{ACT}=F1p_{ACT}+F1q_{ACT}, \text{ in the two-target case with } F1p_{ACT} \text{ and } F1q_{ACT} \neq 0,$$

$$F2_{ACT}=F2p_{ACT}+F2q_{ACT}, \text{ in the two-target case with } F2p_{ACT} \text{ and } F2q_{ACT} \neq 0,$$

can be determined according to the antenna functions F1(x) and F2(x) for the targets (TT1, TT2) detected by the radar beam, and that a processor (PROC) is provided for taking the equation given below for the amplitude monopulse process (index A) or the phase monopulse process (index φ) and solving for the target directions x1 and x2 by using the stored function values:

$$\frac{F1_A(x) - F1_{APACT}}{F1_{AqACT}} = \frac{F2_A(x) - F2_{APACT}}{F2_{AqACT}}$$

$$\frac{-j*F1_\phi(x) - F1_{\phi qACT}}{-F1_{\phi PACT}} = \frac{F2_\phi(x) - F2_{\phi PACT}}{F2_{\phi qACT}}.$$

31. The monopulse radar device according to claim 30, characterized in that the course of the even illumination functions JO2(x) or JO2(y) provided for the curvature measurement corresponds at least approximately to the course of the function:

$$JO2(lx) = Const * (lx^2 - lxO^2) * e^{\frac{lx^2}{2*lxo^2}}$$

or $$JO2(ly) = Const * (ly^2 - lyO^2) * e^{\frac{ly^2}{2*lyo^2}}$$

and/or that the illumination function JO2(lx) provided for measuring the field curvature corresponds to the second derivation of the illumination function Js(lx) provided for measuring the field intensity, and/or that the established course of the illumination function JO2(x) or JO2(y) is approximated to the course of the function $$W2(lx) = \left(\frac{lx}{lxo}\right)^2 - \frac{1}{3} \text{ or } W2(ly) = \left(\frac{ly}{lyo}\right)^2 - \frac{1}{3}$$

taking into account the side lobes permissible.

* * * * *